(12) United States Patent
Kawamata et al.

(10) Patent No.: US 9,234,800 B2
(45) Date of Patent: Jan. 12, 2016

(54) SPECTROMETER

(75) Inventors: Shinya Kawamata, Gotemba (JP); Ryuji Funayama, Yokohama (JP); Tsutomu Ishi, Tokyo (JP); Yumiko Yoshikawa, Tokyo (JP)

(73) Assignees: TOYOTA JIDOSHA KABUSHIKI KAISHA, Toyota-shi (JP); NEC CORPORATION, Tokyo (JP)

( * ) Notice: Subject to any disclaimer, the term of this patent is extended or adjusted under 35 U.S.C. 154(b) by 596 days.

(21) Appl. No.: 13/639,363

(22) PCT Filed: Apr. 8, 2011

(86) PCT No.: PCT/JP2011/058904
§ 371 (c)(1),
(2), (4) Date: Oct. 4, 2012

(87) PCT Pub. No.: WO2011/126112
PCT Pub. Date: Oct. 13, 2011

(65) Prior Publication Data
US 2013/0027702 A1    Jan. 31, 2013

(30) Foreign Application Priority Data
Apr. 9, 2010   (JP) ................................ 2010-090879

(51) Int. Cl.
*G01J 3/28*      (2006.01)
*G01J 3/457*     (2006.01)
(Continued)

(52) U.S. Cl.
CPC ............... *G01J 3/457* (2013.01); *G01J 1/4204* (2013.01); *G01J 3/027* (2013.01); *G01J 3/0264* (2013.01);
(Continued)

(58) Field of Classification Search
CPC ... G01B 11/0625; G01B 11/0641; G01J 3/02; G01J 2001/4242; G01J 3/0208; G01J 3/021; G01J 3/0229; G01J 3/0264; G01J 3/28; G01J 3/2823; G01J 3/457; G06F 17/153
See application file for complete search history.

(56) References Cited

U.S. PATENT DOCUMENTS 4,447,800 A    5/1984   Kasuya et al.
4,947,044 A    8/1990   Pinson
(Continued)

FOREIGN PATENT DOCUMENTS

EP    0 898 148 A2    2/1999
EP    1 718 068 A2    11/2006
(Continued)

OTHER PUBLICATIONS

U.S. Appl. No. 13/639,378, filed Oct. 4, 2012, Funayama, et al.
(Continued)

*Primary Examiner* — Elias Desta
(74) *Attorney, Agent, or Firm* — Oblon, McClelland, Maier & Neustadt, L.L.P.

(57) ABSTRACT

A spectrometer recognizes a measurement target on the basis of the spectral data set of observed light detected by a spectral sensor capable of measuring wavelength information and light intensity information. The spectrometer is provided with a spectral data processor. Spectral data sets are detected at two different positions by the spectral sensor, and the processor subtracts a first spectral data set from a second spectral data set, or divides the first spectral data set by the second spectral data set to calculate one phase correlation spectral data set, which is correlated to the spectral data sets at the two different positions. The processor simultaneously identifies the measurement target corresponding to the two different positions on the basis of the correlation spectral data set.

10 Claims, 19 Drawing Sheets

(51) Int. Cl.
  *G01J 3/02* (2006.01)
  *G01J 1/42* (2006.01)
  *G06K 9/00* (2006.01)
  *G08G 1/16* (2006.01)

(52) U.S. Cl.
  CPC ........... *G01J 3/2823* (2013.01); *G06K 9/00791* (2013.01); *G06K 9/00805* (2013.01); *G08G 1/166* (2013.01); *G06K 2009/00644* (2013.01)

(56) References Cited

U.S. PATENT DOCUMENTS

| | | | |
|---|---|---|---|
| 5,214,408 | A | 5/1993 | Asayama |
| 5,347,475 | A * | 9/1994 | Taylor et al. ................. 703/12 |
| 5,744,796 | A * | 4/1998 | Kinoshita et al. ............ 250/282 |
| 6,919,565 | B2 | 7/2005 | Seto |
| 6,999,024 | B2 | 2/2006 | Kumon et al. |
| 2001/0043330 | A1 | 11/2001 | Jung et al. |
| 2003/0173517 | A1 | 9/2003 | Seto |
| 2004/0065834 | A1 | 4/2004 | Stone et al. |
| 2004/0246167 | A1 | 12/2004 | Kumon et al. |
| 2007/0058776 | A1 * | 3/2007 | Kataoka et al. ................ 378/50 |
| 2007/0246652 | A1 * | 10/2007 | Gopalsami et al. ........ 250/336.1 |
| 2009/0050807 | A1 | 2/2009 | Ota et al. |
| 2009/0073423 | A1 | 3/2009 | Jung et al. |
| 2009/0326383 | A1 | 12/2009 | Barnes et al. |
| 2010/0043706 | A1 | 2/2010 | Jung et al. |
| 2012/0123637 | A1 | 5/2012 | Funayama et al. |

FOREIGN PATENT DOCUMENTS

| | | |
|---|---|---|
| JP | 57-29876 | 2/1982 |
| JP | 7 280724 | 10/1995 |
| JP | 9 172649 | 6/1997 |
| JP | 2000 251052 | 9/2000 |
| JP | 2003 270036 | 9/2003 |
| JP | 2004 191131 | 7/2004 |
| JP | 2005 121601 | 5/2005 |
| JP | 2005 202670 | 7/2005 |
| JP | 2006 14315 | 1/2006 |
| JP | 2006 121617 | 5/2006 |
| JP | 2006 145362 | 6/2006 |
| JP | 2006 242909 | 9/2006 |
| JP | 2007 93306 | 4/2007 |
| JP | 2008 2817 | 1/2008 |
| JP | 2008 27242 | 2/2008 |
| JP | 2008 252173 | 10/2008 |
| JP | 2008 275477 | 11/2008 |
| JP | 2009 55107 | 3/2009 |
| JP | 2009 115498 | 5/2009 |
| JP | 2009 201064 | 9/2009 |
| WO | WO 2010/137172 A1 | 12/2010 |

OTHER PUBLICATIONS

Office Action mailed Jun. 9, 2014 in co-pending U.S. Appl. No. 13/639,378.

Office Action mailed Jan. 7, 2015 in co-pending U.S. Appl. No. 13/639,378.

Dimitris Manolakis, et al., "Hyperspectral Image Processing for Automatic Target Detection Applications" Lincoln Laboratory Journal, vol. 14, No. 1, 2003, pp. 79-116.

International Search Report Issued Jul. 5, 2011 in PCT/JP11/58904 Filed Apr. 8, 2011.

International Preliminary Report on Patentability issued Nov. 6, 2012 in PCT/JP2011/058904 filed Apr. 8, 2011.

Translation of the Written Opinion issued Jul. 5, 2011 in PCT/JP2011/058904 filed Apr. 8, 2011.

Notice of Allowance mailed Sep. 4, 2015, in co-pending U.S. Appl. No. 13/639,378.

* cited by examiner

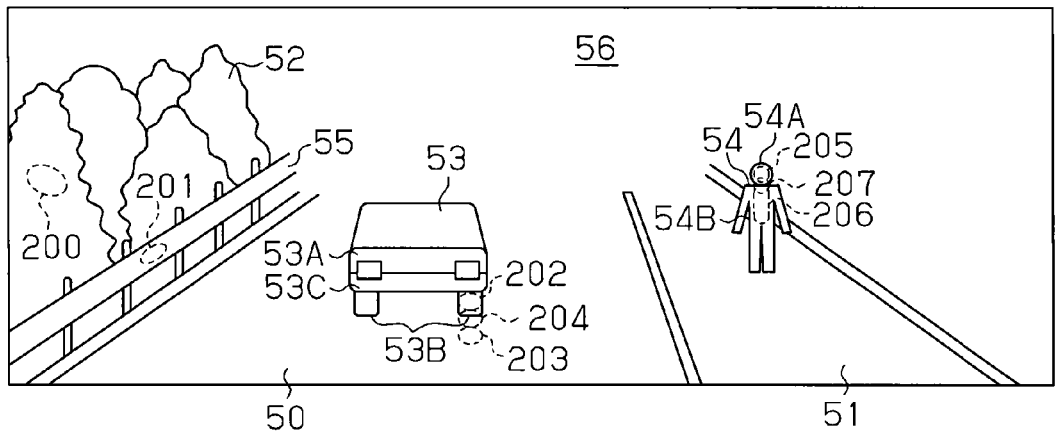

Fig.9(b)  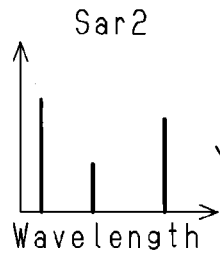

Fig.13(a)
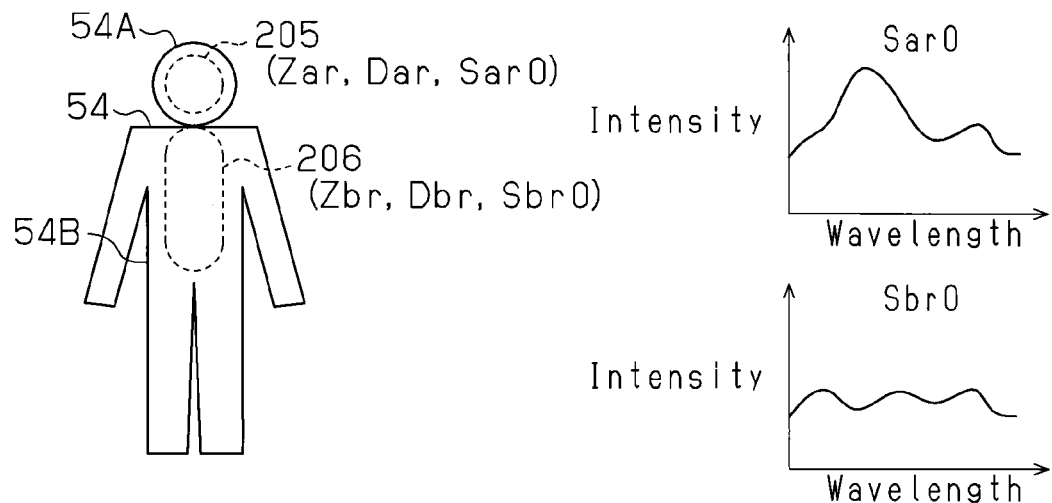
Fig.13(b)
$$\frac{Zbr \times Dbr}{Zar \times Dar} = Pabr$$
Fig.13(c)
$$\frac{Sbr2}{Sar2} \times Pabr = Cabr \longrightarrow$$
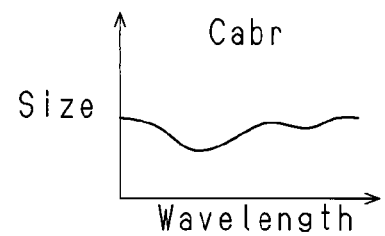

$$\frac{Zb \times Db}{Za \times Da} = Pab$$

$$\frac{Sb2}{Sa2} \times Pab = Cab$$

SPECTROMETER

FIELD OF THE INVENTION

The present invention relates to a spectrometer that recognizes a measurement target that exists in the surrounding environment, in particular, that exists in a traffic environment, based on spectral data obtained by measuring this measurement target by a spectral sensor.

BACKGROUND OF THE INVENTION

In recent years, efforts have been made toward practical use of a technique for recognizing a measurement target that is measured by a spectral sensor and exists in the surrounding environment of the spectral sensor from multispectral data including a visible light region and an invisible light region, and providing various kinds of support in accordance with the recognized measurement target or its state. For example, for vehicles such as automobiles, a drive support device has been examined for practical application that recognizes pedestrians or other vehicles that exist in the surrounding traffic environment of the vehicle based on spectral data measured by a spectral sensor mounted on the vehicle, and supports driving or decision-making of the driver.

Since spectral sensors are designed to measure a spectrum of a reflected light reflected on a measurement target, the spectrum measured by a spectral sensor is directly affected by the spectrum of ambient light radiated to the measurement target. Such ambient light includes solar light and illumination light, which radiates to the measurement target. The spectrum of the ambient light varies under influence of the weather, the brightness around the measurement target, and objects and the like that exist around the measurement target. Therefore, in order to recognize a measurement target based on the spectrum of the reflected light, it is difficult to improve accuracy in recognizing the measurement target, unless the influence of the ambient light radiated to the measurement target is taken into consideration.

Therefore, conventionally, techniques for reducing the influence of ambient light included in spectrum of reflected light have been proposed, and Patent Document 1 describes one example. The spectrometer described in Patent Document 1 includes a spectral sensor for measuring a reflected light spectrum of a measurement target for each pixel; a spectral sensor for detecting a measured ambient light spectrum of a target to be measured in a measurement environment, and calculating means for calculating a spectral reflectance distribution of the measurement target from the reflected light spectrum and the measured ambient light spectrum of these measurement targets. Further, the spectrometer of Patent Document 1 includes a spectral sensor for detecting a reproduced ambient light spectrum in a reproduction environment, spectrum converting means for converting the measurement target to a spectrum at the time of measuring it based on the reproduced ambient light spectrum, and reproducing means for reproducing the converted spectrum. Thus, an influence of the measured ambient light spectrum included in the reflected light spectrum of the measurement target can be removed, and the influence of the reproduced ambient light spectrum can be taken into consideration. Accordingly, the colors of the measurement target measured in the measurement environment can be reproduced with fidelity.

PRIOR ART DOCUMENT

Patent Document

Patent Document 1: Japanese Laid-Open Patent Publication No. 2006-14315

SUMMARY OF THE INVENTION

The spectrometer of the aforementioned Patent Document 1 requires the spectral sensor dedicated for measuring the ambient light spectrum to be measured, and it is preferable that the dedicated spectral sensor measure the ambient light spectrum only. However, generally the ambient light is not always the light from a specific light source particularly in an environment of outdoors. When the measurement target is moved, a position of the light source cannot be easily specified even if there is only one light source. Thus, in a general environment where the ambient light possibly irregularly varies, there is also a high possibility that the influence of the ambient light included in the spectrum of the measurement target cannot be removed or reduced. Namely, even if various kinds of measurement targets that exist around a vehicle is desired to be recognized using the spectral data measured by the aforementioned spectral sensor, it is difficult to recognize measurement targets, which are requested to be recognized for supporting driving of the vehicle, due to low accuracy in recognizing the measurement target under the influence of the ambient light, wherein the measurement target.

An objective of the present invention is to provide a spectrometer capable of removing or reducing influence of an ambient light included in a reflected light spectrum of a measurement target with a simple structure, and capable of further increasing accuracy for recognizing the measurement target.

To achieve the foregoing objective and in accordance with one aspect of the present invention, a spectrometer is provided that recognizes a measurement target based on spectral data of observed light detected by a spectral sensor capable of measuring wavelength information and light intensity information. The spectrometer includes a spectral data processor for calculating one correlation spectral data set, which is correlated to spectral data sets at two different positions detected by the spectral sensor, by subtracting one of the spectral data sets from the other one of the spectral data sets or dividing one of the spectral data sets by the other one of the spectral data sets. The spectral data processor simultaneously identifies measurement targets corresponding to the two different positions based on the correlation spectral data set.

BRIEF DESCRIPTION OF THE DRAWINGS

FIG. 4 is a schematic view schematically showing an example of a measurement target;

FIGS. 5(a) and 5(b) are diagrams schematically showing an example of a spectral image detected by the spectrometer of FIG. 1;

FIGS. 6(a) and 6(b) are diagrams schematically showing an example of the spectral image detected by the spectrometer of FIG. 1;

FIGS. 9(a) to 9(e) are graphs describing a manner of removing an influence of observed light from the spectral data in the spectrometer of FIG. 1;

FIGS. 13(a) to 13(c) are diagrams for describing spectral data to which context has been added;

DETAILED DESCRIPTION OF PREFERRED EMBODIMENTS

A first embodiment of the present invention will now be described with reference to the drawings.

Figure 1:
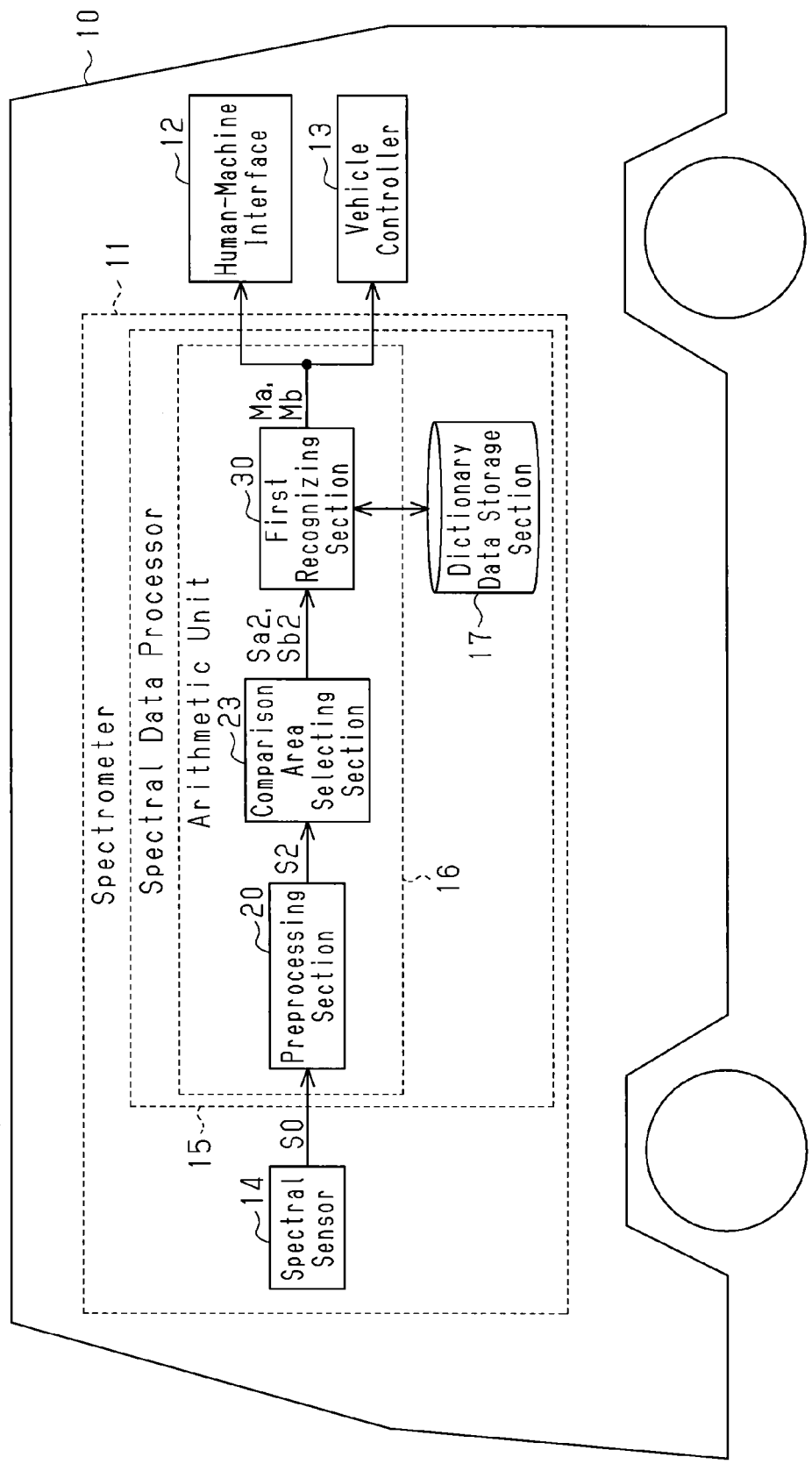
FIG. 1 is a block diagram showing the structure of a spectrometer according to a first embodiment of the present invention.

As shown in FIG. 1, a spectrometer 11 of this embodiment is provided in a vehicle 10, which is a moving body. The spectrometer 11 recognizes a measurement target by acquiring light information including a visible light and an invisible light outside of the vehicle 10. Further, the vehicle 10 includes a human-machine interface 12 for transmitting recognition information and the like output from the spectrometer 11 to occupants of the vehicle 10, and a vehicle controller 13 for reflecting the recognition information and the like output from the spectrometer 11 to control of the vehicle 10.

The human-machine interface 12 is a known interface device including operating units such as push buttons or a touch panel, so that a vehicle state and the like is transmitted to occupants, particularly the driver, through light, colors, and sound, so that the intention of an occupant is input to the spectrometer 11 by operating the buttons and the like.

The vehicle controller 13 is one of a plurality of controllers mounted on the vehicle 10 and is connected to other controllers such as an engine controller, which is also mounted on the vehicle 10, directly or by on-vehicle network, so that required information can be transmitted between these controllers. In this embodiment, when the recognition information (information regarding the recognized measurement target and the like) is input from the spectrometer 11, the vehicle controller 13 transmits this information to other controllers and controls the vehicle 10 to execute drive support, which is requested in accordance with the recognized measurement target.

The spectrometer 11 includes a spectral sensor 14 for detecting a set of spectral data S0 of observed light, and a spectral data processor 15 for processing the data set S0 when receiving the spectral data set S0 of the observed light detected by the spectral sensor 14.

The spectral sensor 14 is designed for detecting the spectral data set S0 of the observed light as a "spectral image", wherein individual spectral data set is included in each pixel that constitutes the spectral image.

The spectral sensor 14 has a function of dispersing the observed light, which is the light including the visible light and the invisible light, to predetermined wavelength bands. Then, the spectral sensor 14 outputs the spectral data to the spectral data processor 15, which is spectral data including wavelength information and light intensity information regarding the dispersed observed light. The wavelength information shows each wavelength included in the dispersed wavelength band, and the light intensity information shows light intensity of the observed light for each wavelength. Namely, the spectral data includes a spectral intensity, which is the light intensity for each wavelength of the observed light, and a spectral shape showing a distribution of the spectral intensity in the wavelength band.

Description will be given for the spectral data of the observed light in a road environment detected by the spectral sensor 14. FIG. 4 is a diagram schematically showing the road environment detected by the spectral sensor 14. FIGS. 5(a) and 5(b) show an example of a spectral data set in an area including a roadway 50 and tires 53B of an automobile 53. FIGS. 6(a) and 6(b) show an example of the spectral data set in an area including a head portion 54A and a body portion 54B of a pedestrian 54. FIGS. 7(a) to 7(e) are graphs showing an example of the spectral data set (spectral shape) of a point (pixel) corresponding to the measurement target detected by the spectral sensor 14.

The spectral sensor 14 detects the set of spectral data S0 of the observed light corresponding to road environment as shown in FIG. 4. In the road environment, there are a roadway 50 paved with asphalt, a sidewalk 51 paved with asphalt extending along one side of the roadway 50, the automobile 53 on the roadway 50, and the pedestrian 54 on the sidewalk 51. Further, a guardrail 55 exists at a side of the roadway 50 opposite to the sidewalk 51, and a plurality of trees 52 grow behind the guardrail 55. Further, a background 56 including the sky is spread in an upper part of the road environment.

The spectral sensor 14 acquires the spectral data set (spectral image) as shown in FIGS. 5(a), 5(b), 6(a) and 6(b), for example, by detecting the spectral data set S0 of the observed light in such a road environment. One pixel of the spectral sensor 14 is schematically shown in each box indicated by broken lines in FIGS. 5(*a*), 5(*b*), FIGS. 6(*a*) and 6(*b*). Symbols "a", "b", "c" are assigned to each box to identify the spectral data (spectral shape), for illustrative purposes. Namely, pixel-detection is executed in such a way that the spectral data of rubber tires indicated by symbol "a" in FIGS. 5(*a*) and 5(*b*), for example, is detected based on the pixels corresponding to the tire 53B, and the spectral data of asphalt indicated by symbol "b" in FIGS. 5(*a*) and 5(*b*), for example, is detected based on the pixels corresponding to the roadway 50. Further, the spectral data of coating indicated by symbol "c" in FIGS. 5(*a*) and 5(*b*), for example, is detected based on the pixels corresponding to a bumper 53C. The spectral data of face skin indicated by symbol "a" in FIGS. 6(*a*) and 6(*b*), for example, is detected based on the pixels corresponding to the head portion 54A, and the spectral data of clothing indicated by symbol "b" in FIGS. 6(*a*) and 6(*b*), for example, is detected based on the pixels corresponding to the body portion 54B. Further, the spectral data of sky indicated by symbol "c" in FIGS. 6(*a*) and 6(*b*), for example, is detected based on the pixel corresponding to the background 56.

Thus, the spectral data of the measurement target detected by the spectral sensor 14 has the spectral shape as shown in FIGS. 7(*a*) to 7(*e*), for example. Namely, the spectral data set (spectral shape) shown in FIG. 7(*a*), for example, is measured from a comparison position 200 of the tree 52 shown in FIG. 4, and the spectral data set (spectral shape) shown in FIG. 7(*b*), for example, is measured from a comparison position 201 of the guardrail 55 shown in FIG. 4. Further, the spectral data set (spectral shape) shown in FIG. 7(*c*), for example, is measured from a boundary area 204 between the tire 53B and the roadway 50 shown in FIG. 4, and the spectral data set (spectral shape) shown in FIG. 7(*d*), for example, is measured from a comparison position 203 of the roadway 50 shown in FIG. 4. Further, the spectral data set (spectral shape) shown in FIG. 7(*e*), for example, is measured from a comparison position 205 of the head portion 54A of the pedestrian 54 shown in FIG. 4.

The spectral data processor 15 is mainly constituted of a microcomputer having an arithmetic unit and a storage unit, for example. The spectral sensor 14 is connected to the spectral data processor 15, and the spectral data set S0 of the observed light detected by the spectral sensor 14 is input into the spectral data processor 15. The spectral data processor 15 identifies the measurement target observed based on the input spectral data set S0 of the observed light, and transmits its recognition result to the human-machine interface 12 and the vehicle controller 13.

The spectral data processor 15 includes an arithmetic unit 16 and a dictionary data storage section 17. The dictionary data storage section 17 is composed of the entirety or a part of a storage area provided in a known storage unit, and the spectral data of a plurality of measurement targets to be identified is previously stored in this storage area as dictionary data. In this embodiment, the dictionary data storage section 17 stores, as the dictionary data, a first data set for matching 17A (see FIG. 3), which is the spectral data set of a plurality of measurement targets subjected to predetermined processing respectively. The predetermined processing is suitable for recognizing measurement targets by the spectral data processor 15, and details thereof will be described below.

The dictionary data in the dictionary data storage section 17 includes data sets based on the spectral data set (spectral shape) of measurement targets to be identified, and the number of the dictionary data sets corresponding to the measurement targets to be identified are prepared. The measurement targets to be identified include moving bodies such as pedestrians (people), bicycles, motorcycles, and automobiles, and also non-moving bodies such as signals, signs, paint applied on a road surface, guardrails, shops, and signboards and the like. Further, as the measurement target to be identified, for example, the pedestrian (people) may be classified into further detailed attributes such as children, old people, men, and women, and also the automobile may be classified into further detailed attributes such as a truck, a bus, a sedan, an SUV, and a light vehicle. The dictionary data storage section 17 includes one or a plurality of storage areas so that previously prepared plurality of dictionary data sets can be stored in a proper state.

The spectral sensor 14 and the dictionary data storage section 17 are connected to the arithmetic unit 16 so that information can be transmitted to each other. The arithmetic unit 16 identifies the measurement target by comparing and matching data sets between the dictionary data sets acquired from the dictionary data storage section 17, and a correlation spectral data set calculated by applying predetermined processing to the spectral data set S0 of the observed light.

The arithmetic unit 16 includes a preprocessing section 20 for applying, to spectral data sets, data processing for reducing the influence of intensity of the ambient light and sensitivity of the sensor on spectral data sets, and includes a comparison area selecting section 23 for selecting two areas (pixels) and acquiring each spectral data set of these areas, and a first recognizing section 30 for identifying a measurement target based on the acquired two spectral data sets.

Figure 2:
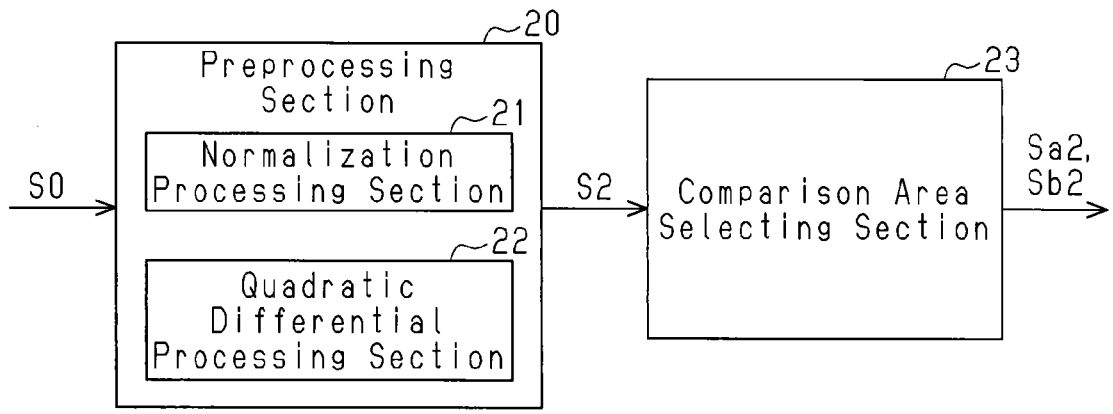
FIG. 2 is a block diagram for describing a function of the spectrometer of FIG. 1.

The preprocessing section 20 receives the spectral data set S0 of the observed light, from the spectral sensor 14. As shown in FIG. 2, the preprocessing section 20 includes a normalization processing section 21 for normalizing the spectral data set S0 under predetermined conditions, and a quadratic differential processing section 22 for applying quadratic differential processing to the normalized spectral data set (normalized spectral data set S1).

Figure 8A:
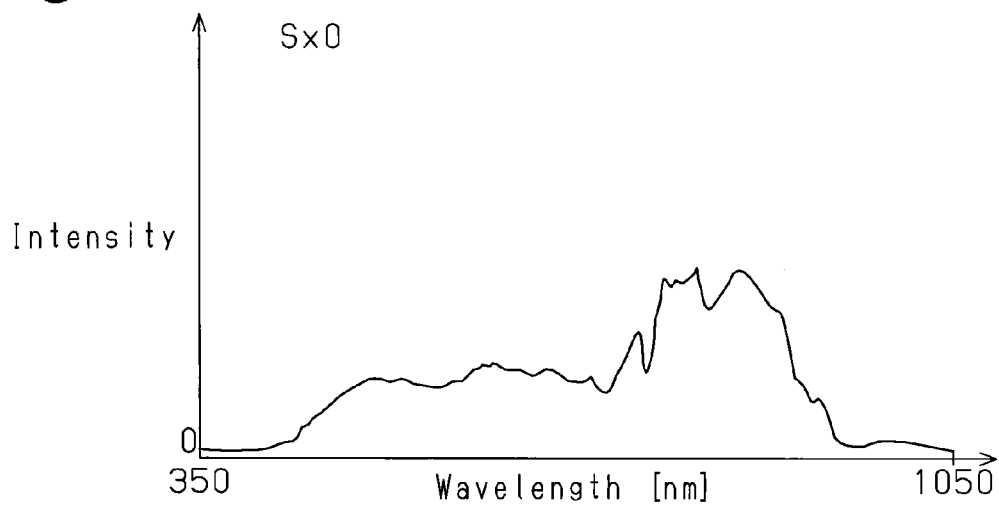
FIGS. 8(a) to 8(c) are graphs showing an example of variation of a shape of the spectral data during preprocessing executed by the spectrometer of FIG. 1.
Figure 8B:
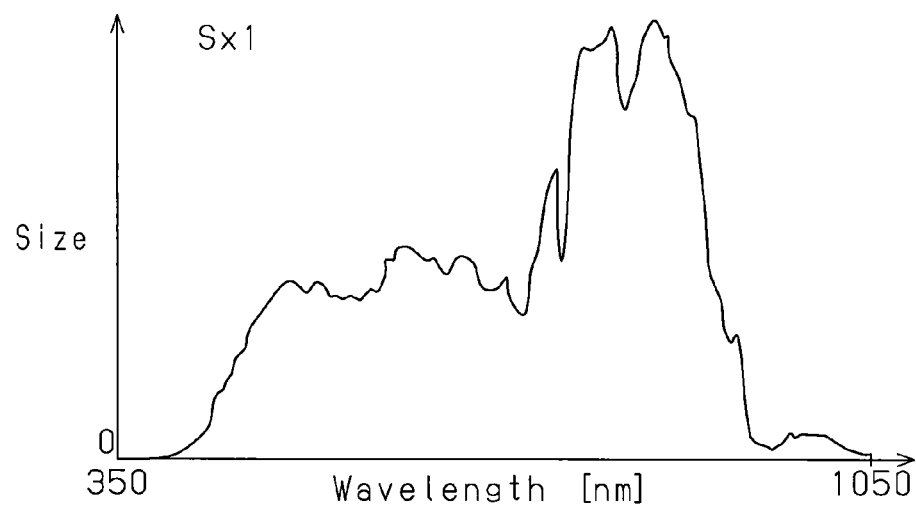
Figure 8C:
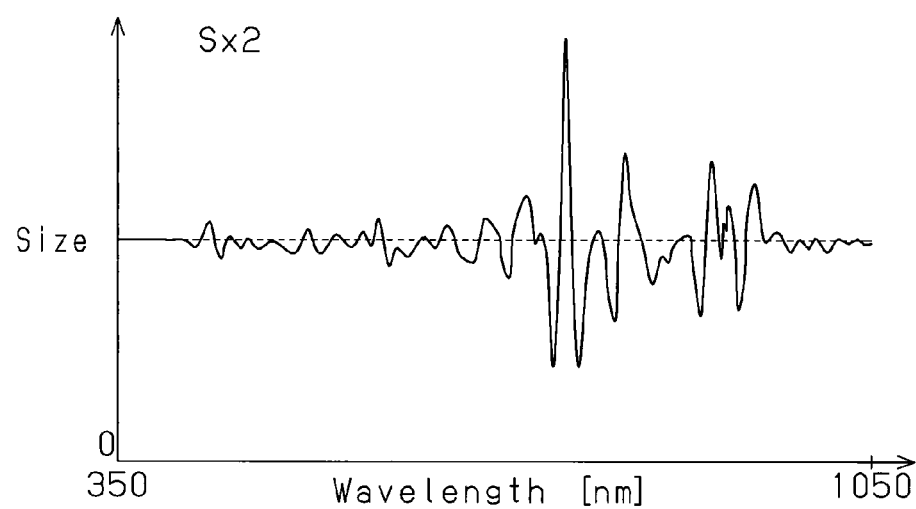

First, the functions of the preprocessing section 20 will be descried based on the drawings. FIGS. 8(*a*) to 8(*c*) are graphs showing variations of the shape of spectral data sets during processing executed by the preprocessing section 20. A spectral data set Sx0 shown in FIG. 8(*a*) corresponds to one pixel x specified in the spectral data set S0 of the observed light.

The spectral data set S0 of the observed light is normalized by the normalization processing section 21 of the preprocessing section 20. Namely, in the normalization processing section 21, the difference in the intensity of the observed light of each pixel and the difference in sensitivity of the sensor of each pixel are equalized, so that normalized spectral data set S0 is generated with reduced influence by these differences, which influence the spectral data set S0 of the observed light. For example, the spectral shape of the spectral data set Sx0 of the pixel x shown in FIG. 8(*a*) is converted to the spectral shape of the normalized spectral data set Sx1 as shown in FIG. 8(*b*), by the normalization processing section 21 using a normalization process.

Further, in the preprocessing section 20, a characterized spectral data set S2 is generated from the normalized spectral data set S1 by applying quadratic differential process to the normalized spectral data set S1 by the quadratic differential processing section 22. The characterized spectral data set S2 includes wavelength information regarding an inflection point and the size of the inflection point. For example, the spectral shape of the normalized spectral data set Sx1 of the pixel x shown in FIG. 8(*b*) is converted to the spectral shape of the characterized spectral data set Sx2 shown in FIG. 8(*c*), by the quadratic differential processing section 22 using a quadratic differential process.

The influence of the intensity of the ambient light and the like on the spectral data of the measurement target is reduced by the aforementioned normalization process and the quadratic differential process. As a result, the spectral data set can be compared with another spectral data set showing different intensity of the observed light, for example. Also, arithmetic operations using both spectral data sets can be carried out.

Thus, the preprocessing section 20 obtains the characterized spectral data set S2 by applying the normalization process and the quadratic differential process to the spectral data set S0 of the observed light input from the spectral sensor 14, and outputs it to the comparison area selecting section 23.

The comparison area selecting section 23 extracts, as one spectrum area, an area (pixel area) in which points (pixels) having similar spectral shapes are collected from the characterized spectral data set S2 input from the preprocessing section 20, and selects two different spectrum areas (positions) for recognition processing from the extracted plurality of spectrum areas. Then, the data sets corresponding to the selected two different spectrum areas (positions) are acquired as comparison position spectral data sets Sa2 and Sb2, and these comparison position spectral data sets Sa2 and Sb2 are output to the first recognizing section 30.

The comparison area selecting section 23 carries out a clustering process based on an Euclidean distance, which is a process for classifying the spectral data sets showing a predetermined value or less of difference in light intensities for each wavelength, as the spectral data set in the same spectrum area. Thus, one or more spectrum areas are extracted from the spectral data set of the observed light. Description will be given based on FIGS. 5(a) and 5(b). For example, when the characterized spectral data set S2 is received from the preprocessing section 20, the comparison area selecting section 23 sets an area in which a plurality of points (pixels) having the spectral shape "a" respectively are collected as a first spectrum area. Similarly, the comparison area selecting section 23 sets an area in which a plurality of points (pixels) having the spectral shape "b" respectively are collected as a second spectrum area. Similarly, the comparison area selecting section 23 sets an area in which a plurality of points (pixels) having the spectral shape "c" respectively are collected as a third spectrum area. Then, the comparison area selecting section 23 selects two mutually adjacent spectrum areas from the first to third spectrum areas as two comparison areas used for the recognition process under a predetermined condition. For example, the comparison area selecting section 23 selects the second spectrum area having a relatively wide area and the first spectrum area adjacent thereto as two comparison positions 202 and 203 used for the recognition process. Then, the spectral data sets corresponding to the selected two comparison positions 202 and 203 are output as comparison position spectral data sets Sa2 and Sb2.

Next, the first recognizing section 30 will be described with reference to FIG. 3 and FIGS. 9(a) to 9(e). FIGS. 9(a) to 9(e) are diagrams describing a method for removing the influence of the ambient light from the two comparison position spectral data sets Sa2 and Sb2 including the ambient light. FIGS. 9(a) to 9(e) show graphs showing that only inflection point for characterizing the comparison position spectral data sets Sa2 and Sb2 and size of the inflection point, are extracted for the illustrative purposes.

Figure 3:
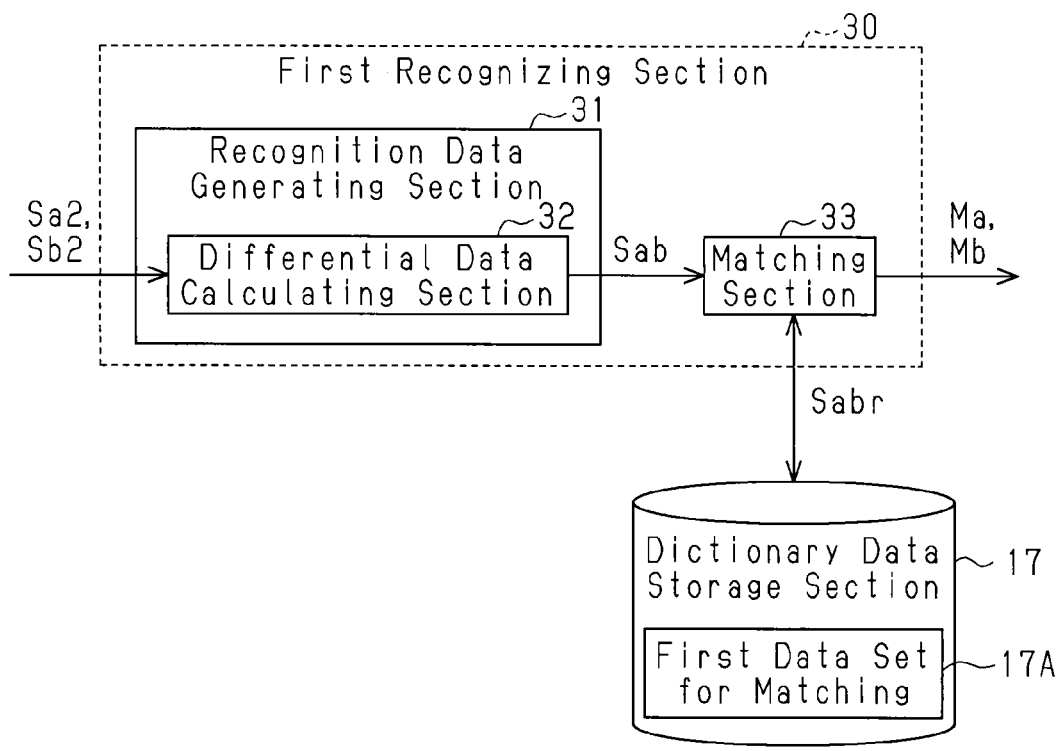
FIG. 3 is a block diagram for describing a function of the spectrometer of FIG. 1.
Figure 7A:
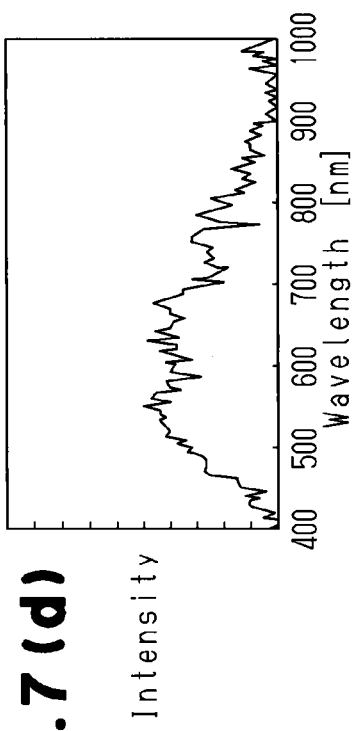
FIGS. 7(a) to 7(e) are graphs showing an example of spectral data of the measurement target detected by the spectrometer of FIG. 1.
Figure 7B:
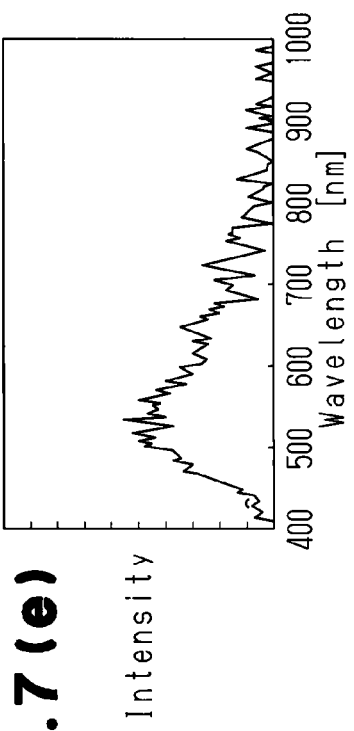
Figure 7C:
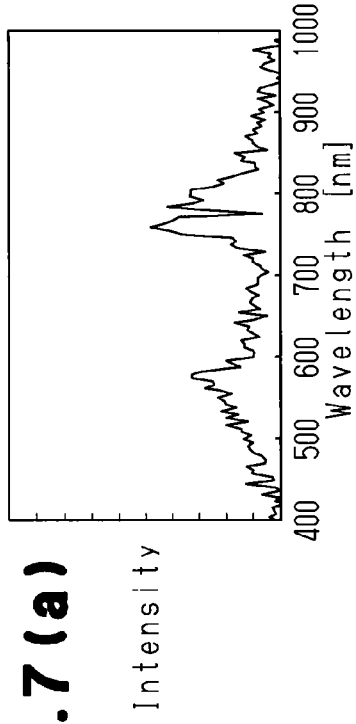
Figure 7D:
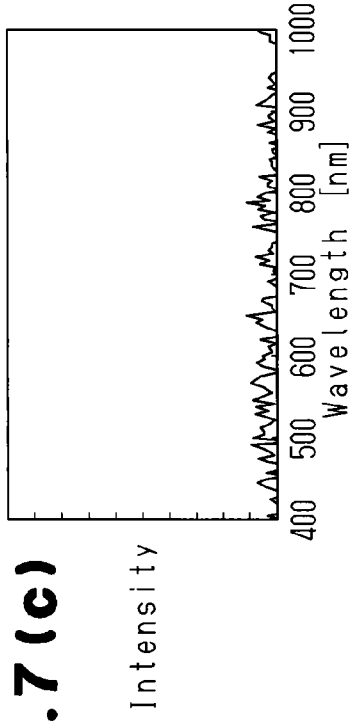
Figure 7E:
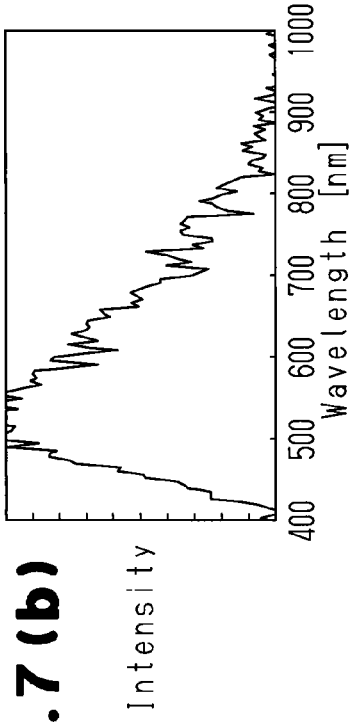

The first recognizing section 30 receives two sets of comparison position spectral data Sa2 and Sb2 from the comparison area selecting section 23. The first recognizing section 30 includes a recognition data generating section 31 and a matching section 33 as shown in FIG. 3.

Figure 9A:
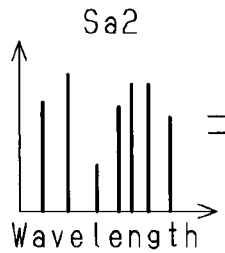
Figure 9E:
Figure 9C:
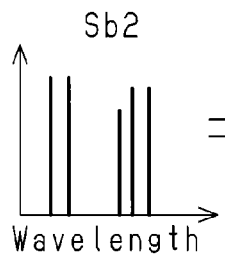
Figure 9D:
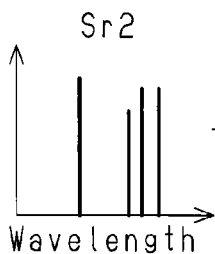

The recognition data generating section 31 includes a differential data calculating section 32 having a function of generating one correlation spectral data set Sab, which is obtained by removing the influence of the ambient light from the two comparison position spectral data sets Sa2 and Sb2. The differential data calculating section 32 calculates a difference between two data sets to thereby convert the calculated value to an absolute value. For example, by the differential data calculating section 32, a differential data set (Sa2−Sb2) is obtained by subtracting the comparison position spectral data set Sb2 (see FIG. 9(c)) from the comparison position spectral data set Sa2 (see FIG. 9(a)), and a correlation spectral data set Sab (Sab=|Sa2−Sb2|) is obtained by converting the differential data set to an absolute value. As shown in FIG. 9(b), the comparison position spectral data set Sa2 includes a spectral data set Sr2 regarding the ambient light and a spectral data set Sar2 regarding the measurement target. Similarly, as shown in FIG. 9(d), the comparison position spectral data set Sb2 includes the spectral data set Sr2 regarding the ambient light and the spectral data set Sbr2 regarding the measurement target. This indicates that the spectral data set Sr2 regarding the ambient light included in both data sets is removed by subtracting the comparison position spectral data set Sb2 from the comparison position spectral data set Sa2, and the differential data set including spectral data sets Sar2 and Sbr2 regarding each measurement target is generated. Thus, one correlation spectral data set Sab is generated, in which the influence of the ambient light is removed from two comparison position spectral data sets Sa2 and Sb2 input from the comparison area selecting section 23. According to this embodiment, the correlation spectral data set Sab is calculated by converting the differential data set to the absolute value in consideration of matching the correlation spectral data set Sab with the dictionary data by the matching section 33.

The matching section 33 simultaneously identifies a plurality of measurement targets Ma and Mb by comparing and matching the correlation spectral data set Sab with a reference data set Sabr which is selected from the first data set for matching 17A of the dictionary data storage section 17 under a predetermined condition.

As described above, the matching section 33 compares the correlation spectral data set Sab with the reference data set Sabr selected from the first data set for matching 17A of the dictionary data storage section 17. Prior to description of the matching section 33, a description is given for the first data set for matching 17A, which is previously stored in the dictionary data storage section 17. The reference data set Sabr is compared with the correlation spectral data set Sab, and therefore the reference data set Sabr needs to have a similar property as the correlation spectral data set Sab. Namely, the reference data set Sabr is generated by applying a similar process to the spectral data set of the measurement target to be identified, which is a process similar to the aforementioned process of calculating the correlation spectral data set Sab from the spectral data set S0. For example, preprocessing (normalization processing and quadratic differential processing) is applied to the previously detected spectral data set of each of the road surface and tire, and thereafter the calculated correlation spectral data set is stored in the dictionary data storage section 17 as one of the first data set for matching 17A. Similarly, the preprocessing is applied to the previously detected spectral data set of each of the head portion and body portion, and thereafter the calculated correlation spectral data set is stored in the dictionary data storage section 17 as one of the first data set for matching 17A. Thus, the first data set for matching 17A stored in the dictionary data storage section 17 is selected as the reference data set Sabr. According to this embodiment, information regarding the measurement target corresponding to the spectral data set that constitutes the reference data set Sabr, is added to the reference data set Sabr selected from the first data set for matching 17A.

The matching section 33 determines whether the acquired reference data set Sabr and the correlation spectral data set Sab are matched with each other by a known matching method. Then, when it is determined that the reference data set Sabr and the correlation spectral data set Sab are matched with each other, two measurement targets corresponding to the two comparison position spectral data sets Sa2 and Sb2 included in the correlation spectral data set Sab are identified as two measurement targets corresponding to the two comparison position spectral data sets included in the reference data set Sabr. When it is determined that the referenced data set Sabr and the correlation spectral data set Sab are not matched with each other, a different reference data set Sabr is selected for re-matching with the correlation spectral data set Sab. Such a re-matching is repeated until a predetermined end condition is established.

The first recognizing section 30 notifies the human-machine interface 12 and the vehicle controller 13 of two identified measurement targets Ma and Mb as a recognition result.

Figure 10:
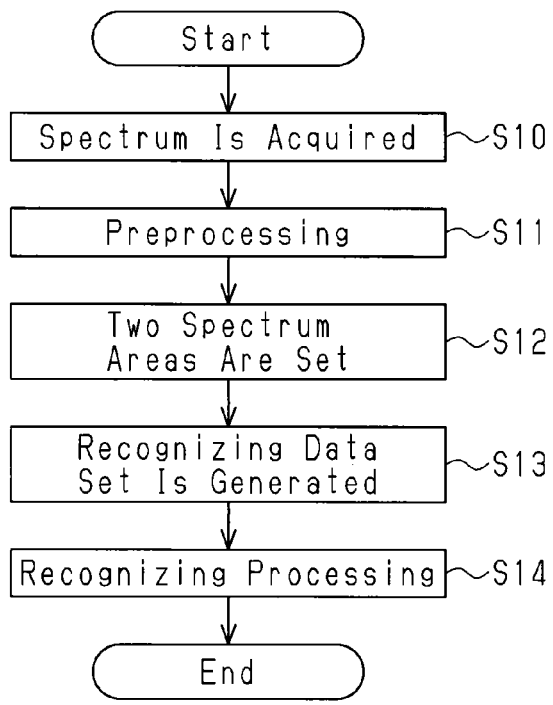
FIG. 10 is a flowchart showing the procedure of a recognition processing for recognizing a measurement target executed by the spectrometer of FIG. 1.

Next, the procedure of the recognition processing according to this embodiment will be described with reference to the flowchart of FIG. 10.

When the recognition processing is started, the arithmetic unit 16 acquires the spectral data set S0 of the observed light from the spectral sensor 14 (step S10), and applies preprocessing to the acquired spectral data set S0 of the observed light and calculates the characterized spectral data set S2 (step S11). Next, the arithmetic unit 16 selects two different spectrum areas from the characterized spectral data set S2, and acquires the comparison position spectral data sets Sa2 and Sb2 from the two spectrum areas respectively (step S12). For example, the spectrum area corresponding to the roadway 50 and the spectrum area corresponding to the tires 53B are selected.

Subsequently, the arithmetic unit 16 calculates the difference between the comparison position spectral data sets Sa2 and Sb2, to thereby remove the influence of the ambient light included in each of the comparison position spectral data sets Sa2 and Sb2, and convert the differential data set to the absolute value, to thereby generate the correlation spectral data set Sab (step S13). Therefore, the correlation spectral data set Sab is obtained by combining the data set of the roadway 50 and the data set of the tire 53B.

The arithmetic unit 16 compares and matches the correlation spectral data set Sab with the reference data set Sabr selected under the previously defined condition, and simultaneously identifies the two measurement targets Ma and Mb corresponding to the correlation spectral data set Sab based on the same property of both data sets (step S14). Namely, when the combined data set of the data set of the asphalt of the roadway (measurement target Ma) and the data set of the tire (measurement target Mb) is selected as the reference data set Sabr, the measurement target is identified as the asphalt (measurement target Ma) and the tires (measurement target Mb) by matching the reference data set Sabr and the correlation spectral data set Sab. Then, the arithmetic unit 16 outputs the recognition result of the two measurement targets Ma and Mb as the recognition result of the spectrometer 11.

The present embodiment has the following advantages.

(1) Generally, spectral data sets at two different positions detected by the spectral sensor 14 include the spectrum of the same ambient light and the spectrum of different measurement targets. Therefore, as described above, a spectral component of the ambient light is removed by calculating the difference between the two spectral data sets, and the correlation spectral data set Sab correlated to the spectral data sets at two different positions can be obtained. Then, by using the correlation spectral data set Sab, namely by using the reference data set Sabr corresponding to the combination of the spectral data sets of two measurement targets in which the spectral component of the ambient light is removed, the two measurement targets are simultaneously identified. Namely, the measurement target can be recognized with high accuracy, in which the influence of the ambient light is removed.

(2) By applying normalization processing and quadratic differential processing to the spectral data set S0 of the observed light, the influence of the intensity of the ambient light and the unevenness of the sensitivity of the spectral sensor 14 can be removed.

(3) By applying the clustering processing, a plurality of spectrum areas corresponding to each of the different measurement targets, are defined in the spectral data set of the observed light. Then, spectral data sets Sa2 and Sb2 at two positions are detected from the mutually adjacent two spectrum areas such as the spectrum area corresponding to the roadway 50, and the spectrum area corresponding to the tire 53B, or the spectrum area corresponding to the head portion 54A and the spectrum area corresponding to the body portion 54B respectively. Thus, the spectral data sets Sa2 and Sb2 at two positions are detected as different measurement targets respectively.

(4) By matching the correlation spectral data set Sab with the first data set for matching 17A (data set group) previously registered in the dictionary data storage section 17 as the data set composed of the combination of the spectral data set of at least two measurement targets corresponding to the correlation spectral data set Sab, the two measurement targets are simultaneously recognized. Thus, the arithmetic operation required for recognition can be shortened.

(5) In a travel environment of the automobile 53, the roadway 50 and the tire 53B are preferably used as the two measurement targets. Namely by using as one measurement target the road surface, which inevitably exists in the surrounding environment of the vehicle that moves on a ground generally, the combination of the two measurement targets is naturally limited. Further, the material of the road surface is limited to asphalt, concrete, soil, gravel, and brick and the like. Therefore, the number of matching can be reduced, to thereby achieve shortening of the time required for identifying the object, and achieve improvement of the accuracy of the identification itself.

Figure 11:
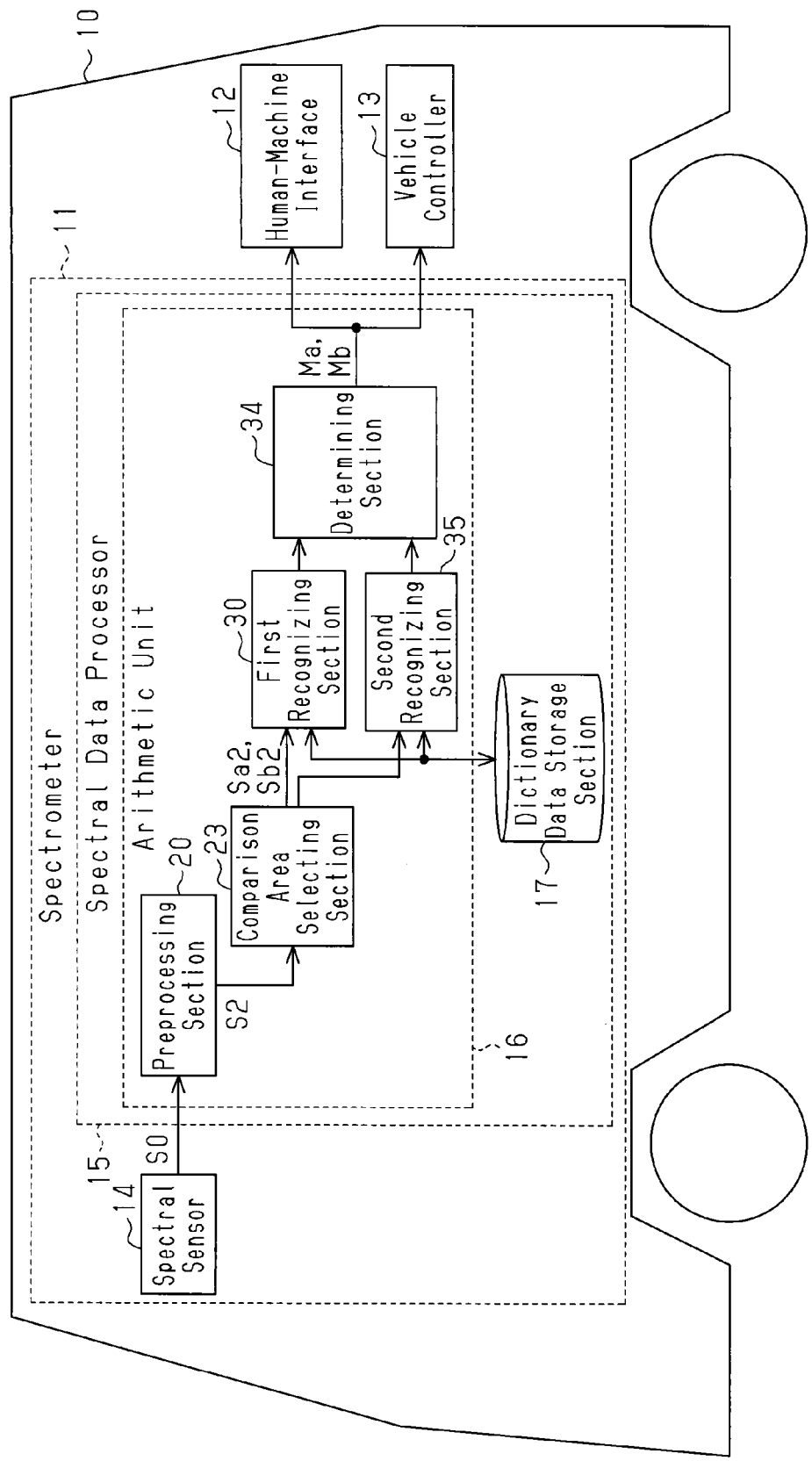
FIG. 11 is a block diagram showing the structure of a spectrometer according to a second embodiment of the present invention.

Next, a second embodiment of the present invention will be described with reference to the drawings. FIG. 11 shows an outline structure of the spectrometer 11 according to this embodiment. The spectrometer 11 of the second embodiment is obtained by adding a second recognizing section and second data set for matching to the spectrometer 11 of the first embodiment, and the other structure is substantially the same as the structure of the first embodiment. Therefore, in this embodiment, the difference from the first embodiment is mainly described, and the same signs and numerals are assigned to the same component as the first embodiment and description thereof is omitted.

Figure 12:
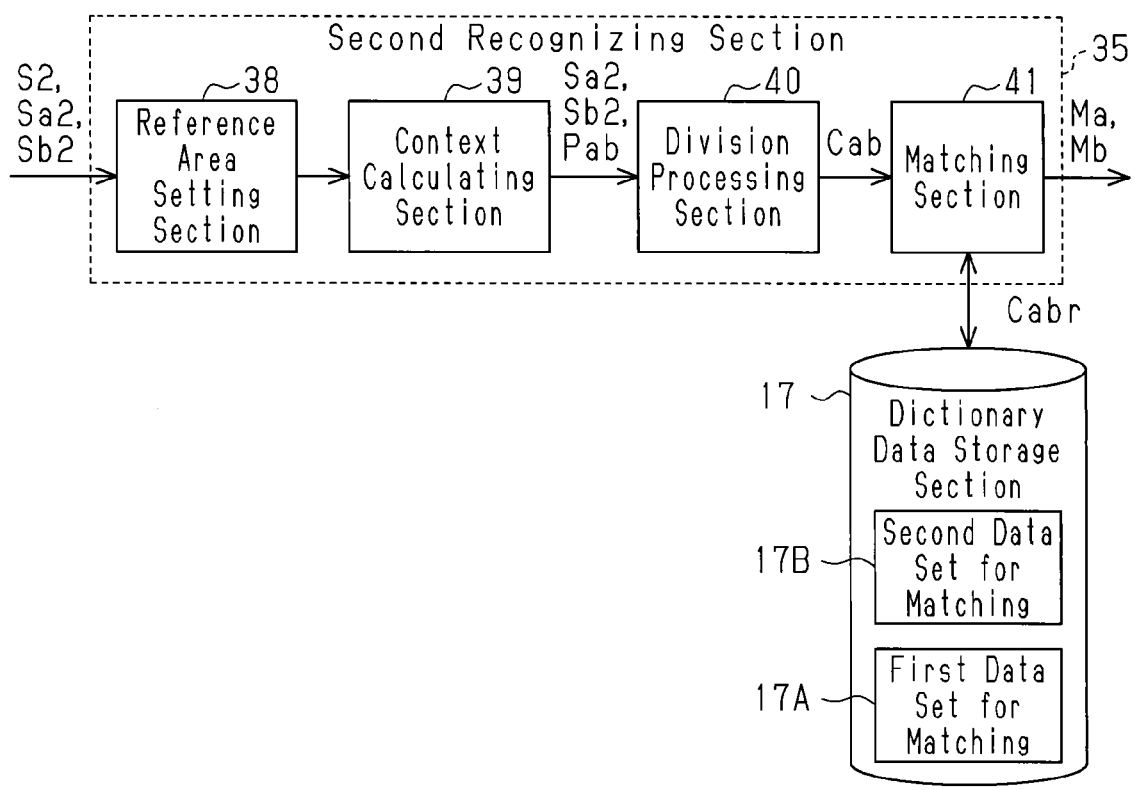
FIG. 12 is a block diagram for describing a function of the spectrometer of FIG. 10.

As shown in FIG. 12, the first data set for matching 17A and the second data set for matching 17B are previously stored in the dictionary data storage section 17 as the dictionary data. The spectral data sets of previously detected two measurement targets and a plurality of data sets based on the context, which is information showing the characteristics of the relationship between the two measurement targets, are stored in the second r data set for matching 17B. In this embodiment, the information showing the characteristics of the relationship between the two measurement targets is information regarding a spatial positional relationship and the ratio of a spatial size of the two measurement targets.

The second data set for matching 17B will be described with reference to FIGS. 13(a) to 13(c). FIGS. 13(a) to 13(c) are diagrams for describing a method for generating the second data set for matching 17B. For example, as shown in FIG. 13(a), when the head portion 54A and the body portion 54B of the pedestrian 54 are previously set as the two measurement targets, the arithmetic unit 16 acquires a spatial position Zar, a size Dar, and a spectral data set Sar0 of the head portion 54A at the comparison position 205, and acquires a spatial position Zbr, a size Dbr, and a spectral data set Sbr0 of the body portion 54B at the comparison position 206. The characteristic of the head portion 54A is expressed by multiplication of the spatial position Zar and the size Dar, and the characteristic of the body portion 54B is expressed by the multiplication of the spatial position Zbr and the size Dbr. Further, regarding the pedestrian 54, by previously defining the head portion 54A as a reference area (basis) with respect to other portions of the body, a context Pabr, which is information showing the characteristic of the relationship between the head portion 54A and the body portion 54B, is expressed by dividing the characteristic of the body portion 54B (Zbr×Dbr) by the characteristic of the head portion 54A (Zar×Dar). Namely, as shown in FIG. 13(b), the context Pabr (Pabr=(Zbr×Dbr)/(Zar×Dar)) is obtained. Then, with the head portion 54A defined as a basis, division (Sbr2/Sar2) is executed, using the preprocessed comparison position spectral data sets Sar2 and Sbr2 of the head portion 54A and the body portion 54B. The data set with reduced influence of the ambient light included in these data sets is thus calculated. Then, reference data set Cabr (Cabr=(Sbr2/Sar2)×Pabr) obtained by multiplying the calculated data set (Sbr2/Sar2) by the context Pabr, is a data set of the second data set for matching 17B. Namely, although the data set expressed by Sbr2/Sar2 does not include the positional relationship between the head portion 54A and the body portion 54B and the like, as information, the reference data set Cabr, which is a data set including the positional relationship of them and the like, can be obtained by adding the context Pabr to (Sbr2/Sar2).

The arithmetic unit 16 of this embodiment includes the preprocessing section 20, the comparison area selecting section 23, the first recognizing section 30, and the second recognizing section 35.

The second recognizing section 35 includes a reference area setting section 38 for setting either one of the two comparison position spectral data sets Sa2 and Sb2 as a reference area (reference position). Further, the second recognizing section 35 includes a context calculating section 39 for obtaining the context Pab, which is information showing the characteristic of the relationship between the two measurement targets, based on the spatial positional relationship and the ratio of the spatial size between the measurement targets corresponding to the two comparison position spectral data sets Sa2 and Sb2 respectively in the characterized spectral data set S2. Further, the second recognizing section 35 includes a division processing section 40 for generating a new correlation spectral data set Cab by dividing one of the comparison position spectral data sets by the other comparison position spectral data set corresponding to the set reference area (reference position), and multiplying the division result by the context Pab. In addition, the second recognizing section 35 includes a matching section 41 for simultaneously identifying each of the measurement targets corresponding to the two comparison position spectral data sets Sa2 and Sb2 by matching the new correlation spectral data set Cab with the reference data set Cabr selected from the second data set for matching 17B of the dictionary data storage section 17.

The reference area setting section 38 is connected to the comparison area selecting section 23, and receives the characterized spectral data set S2, and two comparison position spectral data sets Sa2 and Sb2, from the comparison area selecting section 23. The reference area setting section 38 sets the spectrum area regarding the measurement target corresponding to either one of the two comparison position spectral data sets Sa2 and Sb2 as the reference area under the predetermined condition. For example, when the predetermined condition is a lower side, the comparison position 203 is set as the reference area in the relationship of the comparison position 202 and the comparison position 203 as shown in FIGS. 5(a) and 5(b), and the comparison position 206 is set as the reference area in the relationship of the comparison position 205 and the comparison position 206 as shown in FIGS. 6(a) and 6(b). For example, when the predetermined condition is the road surface, the comparison position 203 is set as the reference area in the relationship of the comparison position 202 and the comparison position 203 as shown in FIGS. 5(a) and 5(b). Further, for example, when the predetermined condition is the face skin, the comparison position 205 is set as the reference area in the relationship of the comparison position 205 and the comparison position 206 as shown in FIGS. 6(a) and 6(b). In this embodiment, the area corresponding to the comparison position spectral data set Sa2 is set as the reference area.

Figures 15A, 15B, 15C:
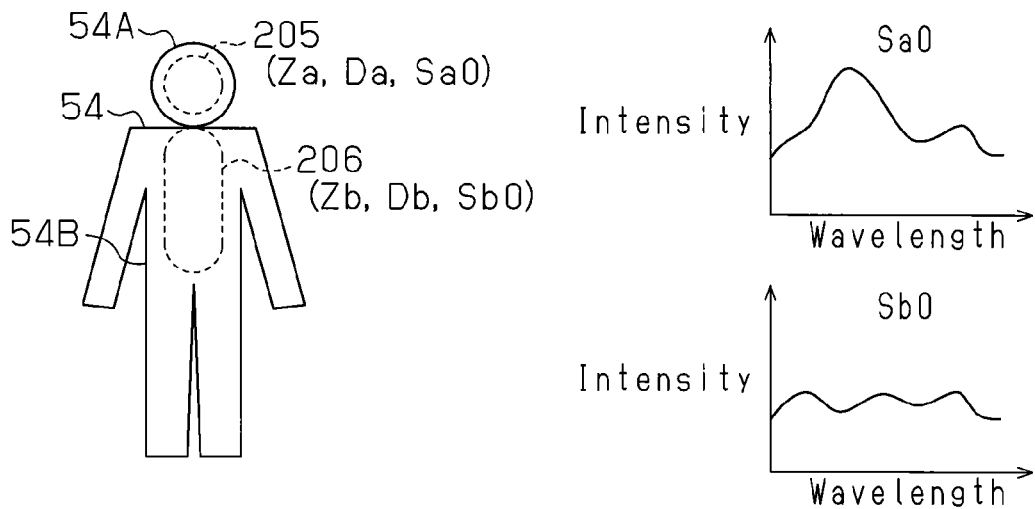
FIGS. 15(a) to 15(c) are diagrams for describing spectral data to which context has been added.

The context calculating section 39 is connected to the reference area setting section 38 and receives, from the reference area setting section, the characterized spectral data set S2, the two comparison position spectral data sets Sa2 and Sb2, and the information regarding the reference area. As shown in FIG. 15(a), the context calculating section 39 obtains the comparison position spectral data set Sa2 based on the spectral data set Sa0 of the first measurement target, and obtains the position Za and its size Da corresponding to the first measurement target in the spectrum area. Further, the context calculating section 39 obtains the comparison position spectral data set Sb2 based on the spectral data set Sb0 of the second measurement target, and obtains the position Zb and its size Db corresponding to the second measurement target in the spectrum area. Then, as shown in FIG. 15(b), a context Pab (Pab=(Zb×Db)/(Za×Da)) is calculated by dividing a value (Zb×Db) by a value (Za×Da), wherein Za×Da is a value obtained by multiplying the position Za by the size Da corresponding to the first measurement target in the spectrum area, and Zb×Db is a value obtained by multiplying the position Zb by the size Db corresponding to the second measurement target in the spectrum area. Thus, the context Pab is obtained as the information characterizing the spatial positional relationship and the relationship of the spatial size of the two measurement targets.

The division processing section 40 is connected to the context calculating section 39, and receives the two comparison position spectral data sets Sa2 and Sb2, and the context Pab, from the context calculating section 39. Then, as shown in FIG. 15(c), the correlation spectral data set Cab (Cab=Sb2/Sa2×Pab) is generated by dividing one of the comparison position spectral data set Sb2 by the other comparison position spectral data set Sa2 corresponding to the reference area, and multiplying the division result by the context Pab. Thus, the spectral data set of the observed light included in both of the two comparison position spectral data sets Sa2 and Sb2, is extracted as the size of "1". Therefore, the influence on the correlation spectral data set Cab can be reduced.

The matching section 41 is connected to each of the dictionary data storage section 17 and the division processing section 40, acquires the second data set for matching 17B of the dictionary data storage section 17 as the reference data set Cabr, and receives the correlation spectral data set Cab from the division processing section 40. The matching section 41 determines whether or not the correlation spectral data set Cab is matched with the reference data set Cabr by matching them with each other. Then, when they are matched with each other, the matching section 41 determines that the correlation spectral data set Cab corresponds to the two measurement targets that constitute the reference data set Cabr, wherein these measurement targets have the spatial positional relationship and the relationship of the ratio of the predetermined spatial size defined in the reference data set Cabr. For example, when the measurement target Ma and the measurement target Mb are the road surface and the tire, an area occupied by the tire is larger in a case where the automobile is viewed from a side compared with a case wherein the automobile is viewed from front or behind. Therefore, by the context regarding the road surface and the tire, the position of the object detected by the spectral sensor can be determined whether it is positioned in a back and forth direction of the automobile or is positioned on the side face of the automobile. Further, for example, when the measurement target Ma and the measurement target Mb are the face skin and the body portion, the face skin is positioned above the body portion and is small. Therefore, the face skin and the body portion are identified based on the spatial positional relationship and the ratio of the spatial size of the face skin with respect to the body portion. Thus, more highly accurate recognition of the measurement target is achieved.

Figure 14:
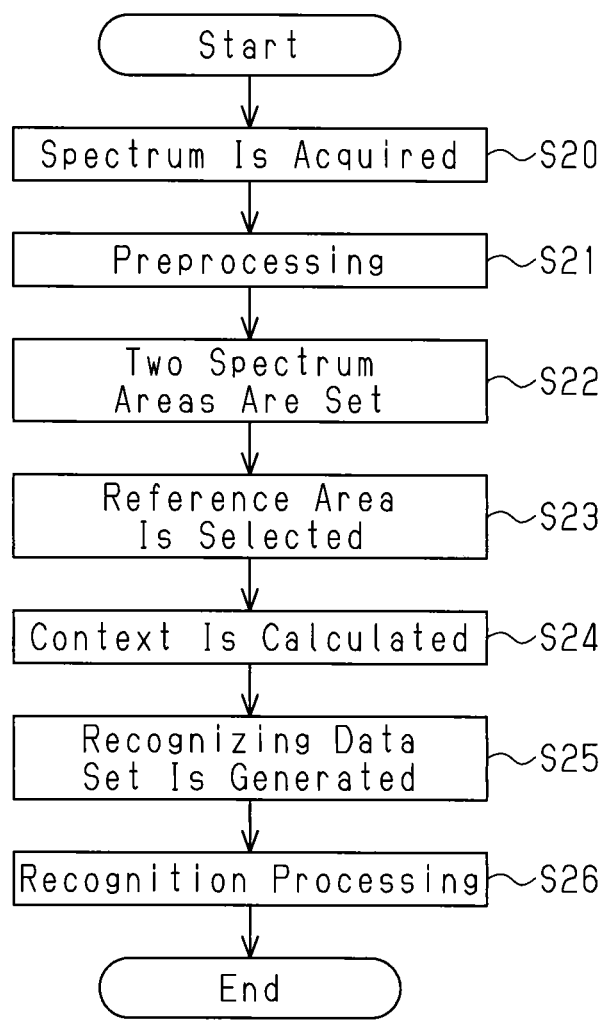
FIG. 14 is a flowchart showing the procedure of a recognition processing for recognizing a measurement target executed by the spectrometer of FIG. 11.

Next, the procedure of the recognition processing according to this embodiment will be described with reference to the flowchart of FIG. 14.

When the recognition processing is started, the arithmetic unit 16 acquires the spectral data set S0 of the observed light from the spectral sensor 14 (step S20), and applies preprocessing to the acquired spectral data set S0 of the observed light, to thereby calculate the characterized spectral data set S2 (step S21). Next, the arithmetic unit 16 selects two different spectrum areas from the characterized spectral data set S2, and acquires the comparison position spectral data sets Sa2 and Sb2 respectively from the two spectrum areas (step S22). Subsequently, the arithmetic unit 16 selects the spectrum area that is a reference area out of the two spectrum areas under a predetermined condition (step S23), and calculates the context Pab based on the characterized spectral data set S2 and the comparison position spectral data sets Sa2 and Sb2 (step S24). Then, the correlation spectral data set Cab is calculated by dividing the comparison position spectral data set Sb2 by the comparison position spectral data set Sa2 corresponding to the reference area, and multiplying the divided data set by the context Pab (step S25). Then, the arithmetic unit 16 compares and matches the correlation spectral data set Cab with the reference data set Cabr selected under the predetermined condition, and by comparing and matching data sets, the two measurement targets Ma and Mb that constitute the correlation spectral data set Cab are simultaneously identified (step S26). Thus, the arithmetic unit 16 outputs to outside the recognition result of the two measurement targets Ma and Mb, as the recognition result of the spectrometer 11.

This embodiment has the following advantages in addition to the advantages (1) to (5) of the first embodiment.

(6) The context Pab showing the characteristic of the relationship between the two measurement targets is obtained, and the correlation spectral data set Cab correlated to the context Pab is also obtained. The correlation spectral data set Cab correlated to the context Pab is a data set clearly showing the characteristic of the combination of the measurement targets. Accordingly, the two measurement targets are more accurately identified by identifying the two measurement targets based on the correlation spectral data set Cab.

(7) When the correlation spectral data set Cab is calculated, a spectral data set that is used as a reference, in other word, a reference area is previously defined as the roadway 50 in the relationship of the roadway 50 and the automobile 53, and defined as the head portion 54A regarding the pedestrian 54. Thus, for example, when the measurement target is identified using the second data set for matching 17B, the quantity of data of the second data set for matching 17B is reduced, and further improvement in accurate identification is expected.

(8) The measurement target can be easily identified by using the roadway 50 as the reference measurement target, which inevitably exists in the surrounding environment of the vehicle 10 that moves on the ground. Namely, the material of the roadway 50 is limited to the asphalt, concrete, soil, gravel, and brick and the like, and therefore the identification is easy. Further, by using the roadway 50 as one of the measurement targets, the other measurement target is naturally limited to the tires of the vehicle 10, the pedestrian, or various kinds of objects on the road surface. As a result, characterizing by the aforementioned context Pab is also easy. This is also one of the factors contributing to the improvement in the accurate identification.

Figure 16:
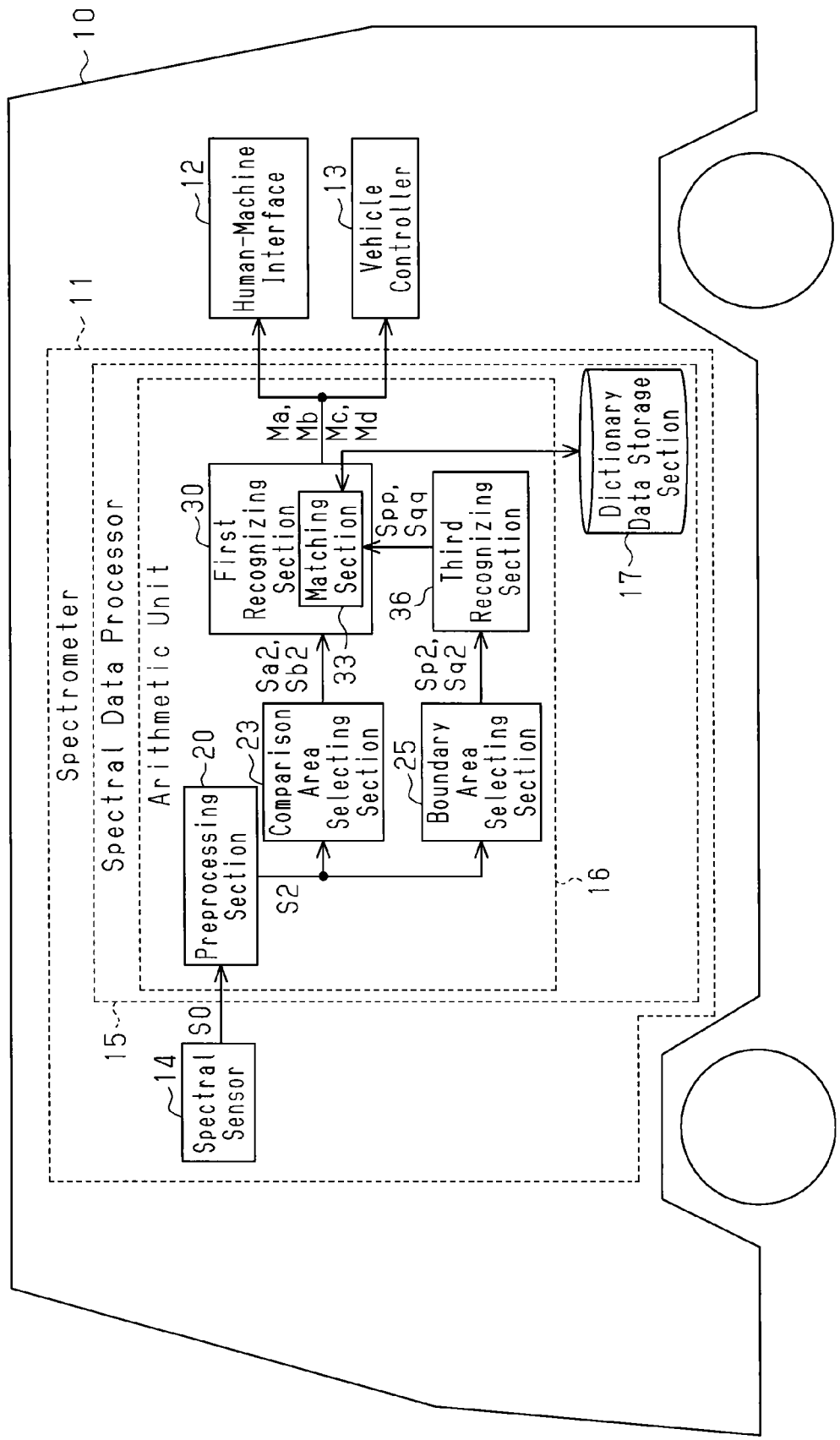
FIG. 16 is a block diagram showing the structure of a spectrometer according to a third embodiment of the present invention.

Next, a third embodiment of the present invention will be described with reference to the drawings. FIG. 16 shows an outline structure of a spectrometer 11 of this embodiment. The spectrometer 11 of the this embodiment is obtained by adding a boundary area selecting section 25 and a third recognizing section 36 to the spectrometer 11 of the first embodiment, and the other structure is substantially the same as the structure of the first embodiment. Therefore, in this embodiment, the difference from the first embodiment is mainly described, and the same signs and numerals are assigned to the same component as the first embodiment and description thereof is omitted.

As shown in FIG. 16, the arithmetic unit 16 of this embodiment includes the boundary area selecting section 25 and the third recognizing section 36 in addition to the preprocessing section 20, the comparison area selecting section 23, and the first recognizing section 30.

The boundary area selecting section 25 extracts a portion in which a spectral waveform varies from the spectral data (spectral image) as a boundary portion between a plurality of measurement targets, and also selects the extracted two boundary portions under a predetermined condition. Namely, the boundary area selecting section 25 selects the two boundary portions from the characterized spectral data set S2 input from the preprocessing section 20. For example, one of the boundary portions will be described using FIG. 5(b). A boundary area 204 corresponding to a boundary between a spectral shape "a" and a spectral shape "b" is selected. Further, the other boundary portion will be described using FIG. 6(b), for example. A boundary area 207 corresponding to the boundary between the spectral shape "a" and the spectral shape "b" is selected. Then, the boundary area selecting section 25 acquires comparison boundary position spectral data sets Sp2 and Sq2, which are the spectral data sets corresponding to the selected two boundary areas, from the characterized spectral data set S2 respectively.

The third recognizing section 36 is connected to the boundary area selecting section 25 and removes the ambient light included in the comparison boundary position spectral data sets Sp2 and Sq2 input from the boundary area selecting section 25. The third recognizing section 36 calculates the data common to these data sets, namely the characterized spectral data set, which is a data set corresponding to the ambient light, from a logical conjunction of the two comparison boundary position spectral data sets Sp2 and Sq2. Then, the third recognizing section 36 obtains the correlation spectral data sets Spp and Sqq from the difference between the characterized spectral data set corresponding to the ambient light and the comparison boundary position spectral data sets Sp2 and Sq2. Thus, one correlation spectral data set Spp is calculated, with influence of the ambient light removed from the comparison boundary position spectral data set Sp2. The correlation spectral data set Spp is a data set based on the spectral data sets of two measurement targets that constitute the boundary portion, such as the spectral data set of the tire 53B and the spectral data set of the roadway 50 that exist in the boundary area 204 of FIG. 5(b). Similarly, one correlation spectral data set Sqq with the influence of the ambient light removed, is calculated from the comparison boundary position spectral data set Sq2. The correlation spectral data set Sqq is a data set based on the two measurement targets that constitute the boundary portion, such as the spectral data set of the head portion 54A and the spectral data set of the body portion 54B that exist in the boundary area 207 of FIG. 6(b), for example.

The calculated correlation spectral data sets Spp and Sqq correspond to the correlation spectral data set Sab of the first embodiment. Therefore, the two measurement targets that constitute these data sets, such as the measurement targets Ma and Mb, or the measurement targets Mc and Md are simultaneously identified by matching data sets using the matching section 33 of the first recognizing section 30.

Figure 17:
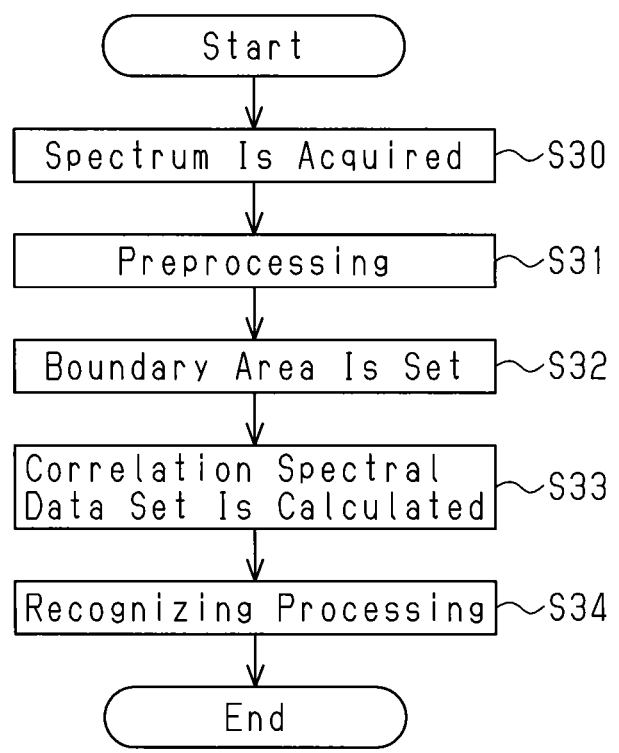
FIG. 17 is a flowchart showing the procedure of a recognition processing for recognizing a measurement target executed by the spectrometer of FIG. 16.

Next, the procedure of the recognition processing according to this embodiment will be described with reference to the flowchart of FIG. 17.

When the recognition processing is started, the arithmetic unit 16 acquires the spectral data set S0 of the observed light from the spectral sensor 14 (step S30), and applies preprocessing to the acquired spectral data set S0 of the observed light, to thereby calculate the characterized spectral data set S2 (step S31). Next, the arithmetic unit 16 selects the boundary area at two different positions from the characterized spectral data set S2, and acquires comparison boundary position spectral data sets Sp2 and Sq2 from these boundary areas (step S32). The arithmetic unit 16 generates correlation spectral data sets Spp and Sqq with the influence of the ambient light removed, which is a light included in these comparison boundary position spectral data sets Sp2 and Sq2 (step S33).

Then, the arithmetic unit 16 compares and matches the correlation spectral data sets Spp and Sqq with the reference data set Sabr including the spectral data sets of the two measurement targets selected from the first data set for matching 17A under a predetermined condition. Thus, the two measurement targets Ma and Mb that constitute the correlation spectral data set Spp are simultaneously identified based on comparing and matching data sets. In addition, two measurement targets Mc and Md that constitute the correlation spectral data set Spp are also simultaneously identified (step S34). Then, the arithmetic unit 16 outputs to outside the recognition result of the two measurement targets Ma and Mb, and the recognition result of the two measurement targets Mc and Md, as the recognition results of the spectrometer 11.

This embodiment has the following advantages in addition to the advantages (1) to (5) of the first embodiment.

(9) Each of the comparison boundary position spectral data sets Sp2 and Sq2 at two different positions is the spectral data set of the boundary portion of at least two different measurement targets. Therefore, further more measurement targets can be simultaneously recognized by increasing the number of measurement targets to be measured included in the spectral data set. Further, the time required for recognizing the measurement target can also be shortened.

(10) As described above, since the spectral data set of the roadway 50 is included in a part of the spectral data set, the identification of the measurement target is easy, and the time required for identifying the measurement target can be shortened.

Figure 18:
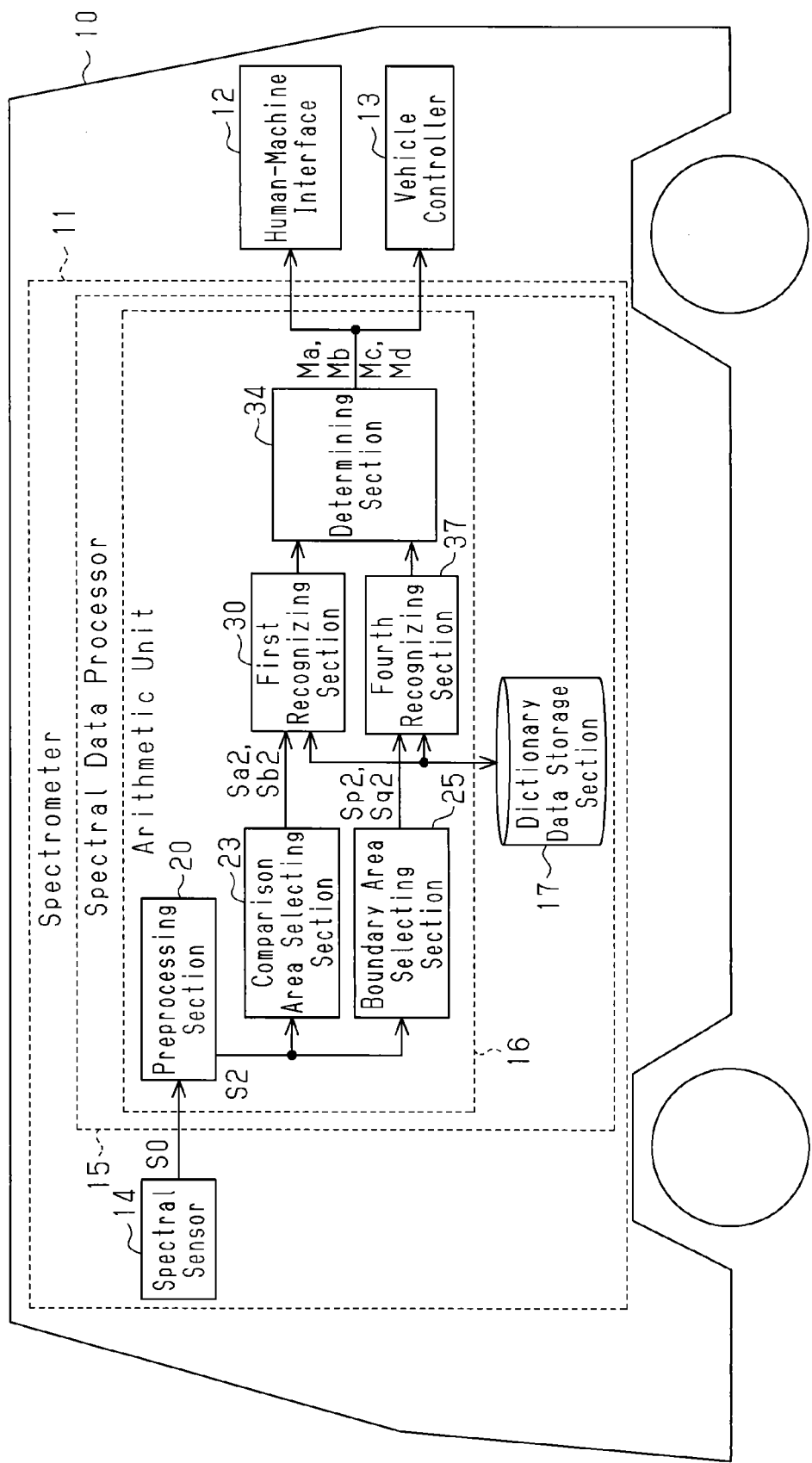
FIG. 18 is a block diagram showing the structure of a spectrometer according to a fourth embodiment of the present invention.

Next, a fourth embodiment of the present invention will be described with reference to the drawings. FIG. 18 shows an outline structure of the spectrometer 11 of this embodiment. The spectrometer 11 of the fourth embodiment is obtained by adding a boundary area selecting section 25, a fourth recognizing section 37, and a determining section 34 to the spectrometer 11 of the first embodiment, and the other structure is substantially the same as the structure of the first embodiment. Therefore, in this embodiment, the difference from the first embodiment is mainly described, and the same signs and numerals are assigned to the same component as the first embodiment and description thereof is omitted.

Figure 19:
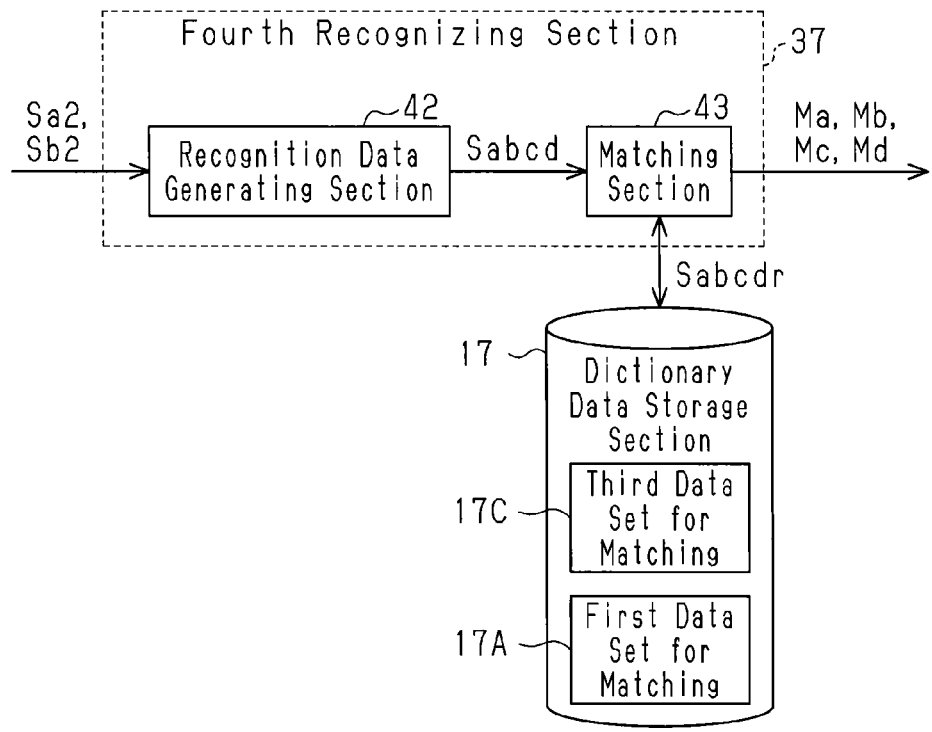
FIG. 19 is a block diagram for describing a function of the spectrometer of FIG. 18.

As shown in FIG. 19, the dictionary data storage section 17 of this embodiment previously stores the first data set for matching 17A and the third data set for matching 17C as the dictionary data. The first data set for matching 17A is similar to that of the first embodiment. The property of the third data set for matching 17C is also similar to that of the first data set for matching 17A. Namely, only different point is that the first data set for matching 17A is a data set based on the combination of the data sets of the two measurement targets, while the third data set for matching 17C is a data set based on the combination of the data sets of four measurement targets, and there is no difference in the property of the data sets.

As shown in FIG. 18, the arithmetic unit 16 of this embodiment includes the boundary area selecting section 25 and the fourth recognizing section 37 in addition to the preprocessing section 20, the comparison area selecting section 23, and the first recognizing section 30. The boundary area selecting section 25 of this embodiment is the same as the boundary area selecting section 25 described in the third embodiment, and therefore description thereof is omitted.

The fourth recognizing section 37 removes the ambient light included in each of the comparison boundary position spectral data sets Sp2 and Sq2. The fourth recognizing section 37 is connected to the boundary area selecting section 25. The fourth recognizing section 37 includes a recognition data generating section 42 and a matching section 43. If compared with the recognition data generating section 31 of the first embodiment, the recognition data generating section 42 is different from the recognition data generating section 31 in a point that the number of the measurement targets corresponding to the input spectral data sets is not one but two, and has the same function excluding this point, and therefore detailed description thereof is omitted. Namely, the recognition data generating section 31 of the first embodiment generates the correlation spectral data set Sab regarding the two measurement targets with the influence of the ambient light removed, based on a differential value and an absolute value of the comparison position spectral data sets Sa2 and Sa2 of one measurement target. The recognition data generating section 42 of this embodiment generates correlation spectral data set Sabcd regarding four measurement targets with the influence of the ambient light removed, based on a differential value and an absolute value of the comparison boundary position spectral data sets Sp2 and Sq2 of two measurement targets.

If compared with the matching section 33 of the first embodiment, the matching section 43 of this embodiment is different from the matching section 33 in a point that the number of the measurement targets corresponding to the input correlation spectral data set Sabcd is not two but four, and has the same function excluding this point, and therefore detailed description thereof is omitted. Namely, the matching section 33 of the first embodiment simultaneously identifies two measurement targets by comparing and matching the correlation spectral data set Sab regarding the two measurement targets, with the reference data set Sabr selected from the first data set for matching of the two measurement targets. The matching section 43 of this embodiment simultaneously identifies the four measurement targets by comparing and matching the correlation spectral data set Sabcd of the four measurement targets, with the reference data set Sabcdr selected from the third data set for matching 17C of the four measurement targets.

The determining section 34 adjusts an identification result of the first recognizing section 30 and an identification result of the fourth recognizing section 37. Namely, when a difference and inconsistency are generated between the identification result of the first recognizing section 30 and the identification result of the fourth recognizing section 37, the determining section 34 determines priority of each identification result under a previously defined condition, and outputs the identification result determined to have higher priority, as the recognition result of the spectrometer 11.

Figure 20:
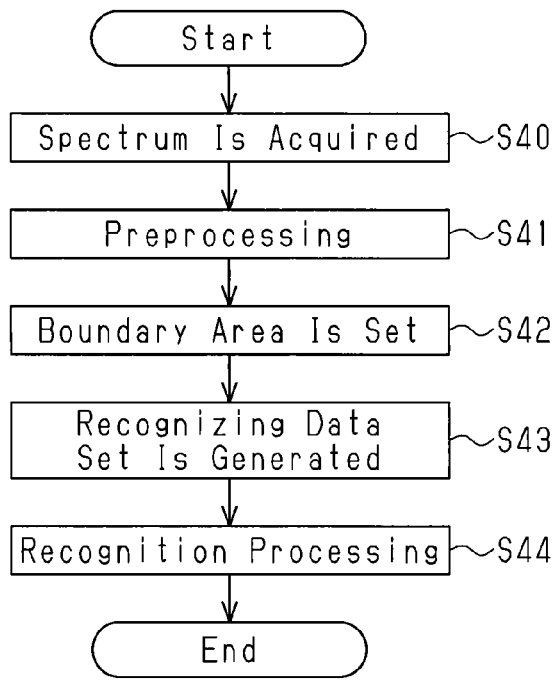
FIG. 20 is a flowchart showing the procedure of a recognition processing for recognizing a measurement target executed by the spectrometer of FIG. 18.

Next, the procedure of the recognition processing according to this embodiment will be described with reference to the flowchart of FIG. 20.

When the recognition processing is started, the arithmetic unit 16 acquires the spectral data set S0 of the observed light from the spectral sensor 14 (step S40), and applies preprocessing to the acquired spectral data set S0 of the observed light, and calculates the characterized spectral data set S2 (step S41). Next, the arithmetic unit 16 selects from the characterized spectral data set S2 the boundary areas at two different positions, and acquires the comparison boundary position spectral data sets Sp2 and Sq2 from these boundary areas respectively (step S42). The arithmetic unit 16 obtains the differential data set of these comparison boundary position spectral data sets Sp2 and Sq2 and the absolute value of this differential data set, to thereby generate the correlation spectral data set Sabcd with the influence of the ambient light removed, which is influence included in these data set (step S43). Then, the arithmetic unit 16 compares and matches the correlation spectral data set Sabcd with the reference data set Sabcdr including the spectral data sets of four measurement targets selected from the third data set for matching 17C, under the previously defined condition. Thus, four measurement targets Ma, Mb, Mc, and Md are simultaneously identified by comparing and matching data sets as described above, which are the measurement targets that constitute the correlation spectral data set Sabcd (S44). Then, the arithmetic unit 16 outputs to outside the recognition result of the four measurement targets Ma, Mb, Mc, and Md as the recognition result of the spectrometer 11.

This embodiment has the following advantages in addition to the advantages (1) to (5) of the first embodiment.

(11) The comparison boundary position spectral data sets Sp2 and Sq2 at two different positions are each the spectral data set of the boundary portion of at least two different measurement targets. Then, the correlation spectral data set Sabcd regarding the four measurement targets is generated from these comparison boundary position spectral data sets Sp2 and Sq2, and this correlation spectral data set Sabcd is matched with the reference data set Sabcdr selected from the third data set for matching 17C of the four measurement targets. As a result, the number of measurement targets to be measured included in the spectral data sets is increased, and further more plurality of measurement targets can be recognized at once. Thus, the time required for recognizing the measurement targets can be shortened.

Each of the aforementioned embodiments may also be modified as follows.

Each of the aforementioned embodiments shows a case, for example, in which the arithmetic unit 16 executes all the processes required for the recognition processing, which includes the preprocessing executed by the preprocessing section 20 and the comparison area selection processing executed by the comparison area selecting section 23. However, the present invention is not limited thereto, and it is also acceptable that these processes are executed by a plurality of different arithmetic units, and obtained arithmetic results are shared by these arithmetic units.

In each of the aforementioned embodiments, mutually adjacent two spectrum areas (for example, the spectrum area corresponding to the roadway 50 and the spectrum area corresponding to the tires 53B) are selected from a plurality of spectrum areas, as two comparison areas used for the recognition processing. However, the present invention is not limited thereto, and two spectrum areas that are not adjacent to each other may be selected from the plurality of spectrum areas, as two comparison areas used for the recognition processing.

Each of the aforementioned embodiments shows a case, for example, in which the preprocessing section 20 carries out the normalization processing and the quadratic differential processing. However, the present invention is not limited thereto, and the preprocessing section 20 may carry out only one of the normalization processing and the quadratic differential processing. In this case, the reference data set used for matching data sets is preferably the data set that has undergone similar processing.

In each of the aforementioned embodiments, the normalization processing is executed under the previously defined condition. However, the present invention is not limited thereto, and an executing condition of the normalization processing may be arbitrarily variably set by another controller or a human-machine interface. This applies not only to the normalization processing, but also to other processing.

Each of the aforementioned embodiments shows a case, for example, in which the first recognizing section 30 calculates the difference between two comparison position spectral data sets Sa2 and Sb2 as the correlation spectral data set Sab. However, the present invention is not limited thereto, and if the ambient light included in the two comparison position spectral data sets can be removed or reduced, it is also acceptable that the correlation spectral data set Sab may be obtained as the ratio of the two comparison position spectral data sets, which is obtained by dividing one of the two comparison position spectral data sets by the other.

The aforementioned second embodiment shows a case, for example, in which the correlation spectral data set Sab is calculated by the second recognizing section 35, by division processing using two comparison position spectral data sets Sa2 and Sb2. However, the present invention is not limited thereto, and if the ambient light included in the two comparison position spectral data sets can be removed or reduced, the difference between the two comparison position spectral data sets may be obtained as the correlation spectral data set.

In each of the aforementioned embodiments, the dictionary data storage section 17 stores the first data set for matching 17A regarding the combination of the spectral data sets of a plurality of measurement targets. However, the present invention is not limited thereto, and the dictionary data storage section 17 may store the data set for matching based on the spectral data set of one measurement target respectively. In this case, by selecting and combining a plurality of data set for matching as needed, the reference data set can be generated, which is used for the comparison with the correlation spectral data set.

Each of the aforementioned embodiments shows a case, for example, in which the difference between the two comparison position spectral data sets Sa2 and Sb2 is converted to an absolute value, to thereby calculate the correlation spectral data set Sab. However, the present invention is not limited thereto, and if the influence of the ambient light can be removed or reduced, the correlation spectral data set may be obtained without converting the difference between the two comparison position spectral data set to the absolute value.

The aforementioned second, third, and fourth embodiments show a case, for example, in which the arithmetic unit 16 includes a plurality of recognizing sections. However, the present invention is not limited thereto, and the arithmetic unit may include only one recognizing section. With this structure as well, the measurement target can be recognized with the influence of the observed light removed or reduced.

Figure 21:
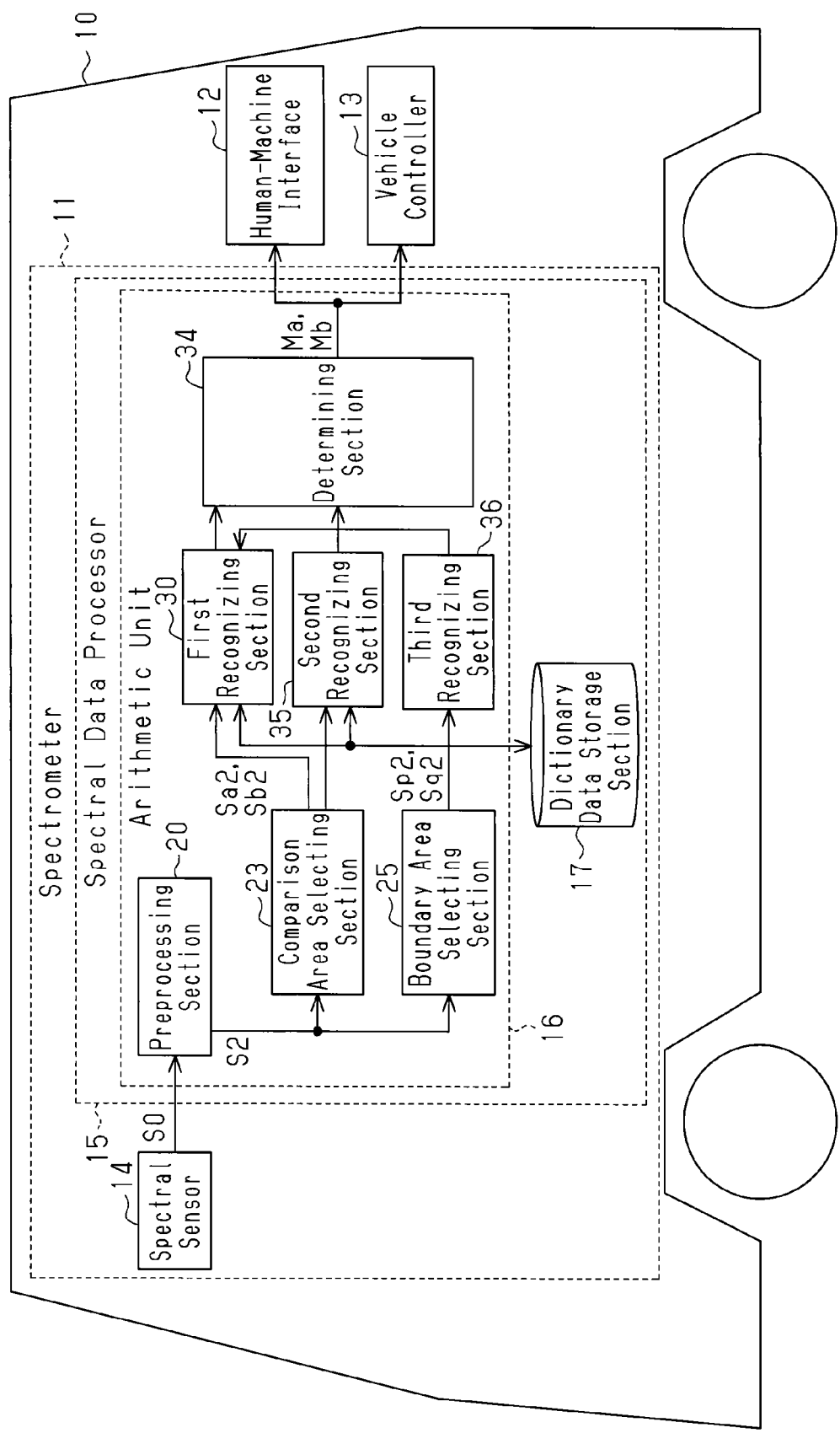
FIG. 21 is a block diagram showing the structure of a spectrometer according to another embodiment of the present invention.
Figure 22:
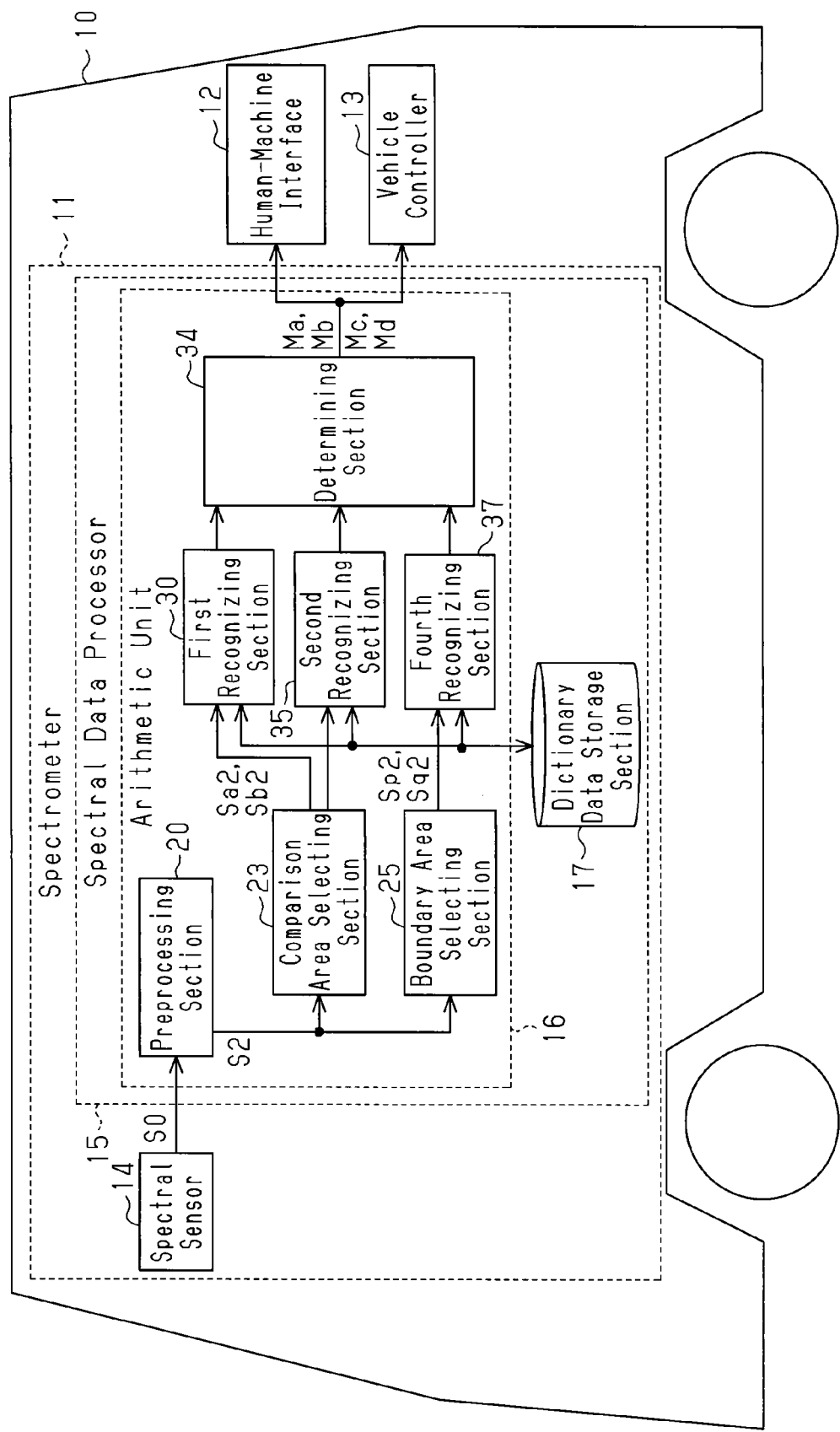
FIG. 22 is a block diagram showing the structure of a spectrometer according to another embodiment of the present invention.
Figure 23:
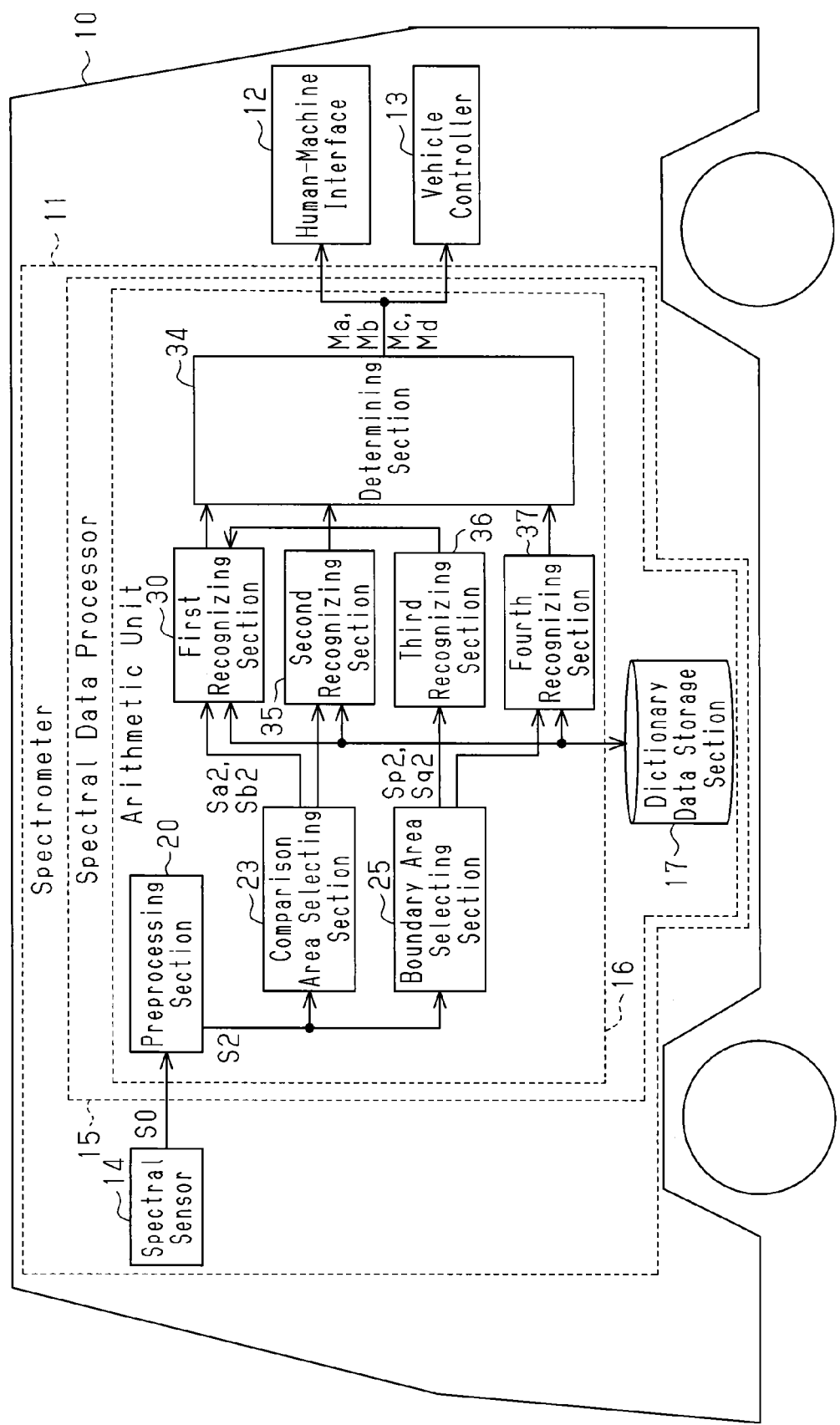
FIG. 23 is a block diagram of the structure of a spectrometer according to another embodiment of the present invention.

In each of the aforementioned second, third, and fourth embodiments, the combination of the plurality of recognizing sections is simply shown as an example, and a combination other than the aforementioned combination is acceptable. For example, as shown in FIG. 21, the arithmetic unit 16 may include the first recognizing section 30, the second recognizing section 35, and the third recognizing section 36. Further, for example, as shown in FIG. 22, the arithmetic unit 16 may include the first recognizing section 30, the second recognizing section 35, and the fourth recognizing section 37. Further, for example, as shown in FIG. 23, the arithmetic unit 16 may include the first recognizing section 30, the second recognizing section 35, the third recognizing section 36, and the fourth recognizing section 37.

The aforementioned second embodiment shows a case, for example, in which the context Pab is calculated based on the spatial positional relationship and the relationship of the spatial size. However, the present invention is not limited thereto, and the context Pab may be calculated based on either one of the spatial positional relationship and the relationship of the spatial size.

In the aforementioned second embodiment, the characteristic of the measurement target is expressed by the multiplication of the spatial position and the spatial size. However, the present invention is not limited thereto, and the characteristic of the measurement target may be expressed by addition, subtraction, or division of the spatial position and the spatial size.

In the aforementioned second embodiment, the context Pab is calculated by dividing the characteristic of one measurement target (spatial position and the spatial size) by the characteristic of the other measurement target. However, the present invention is not limited thereto, and the context Pab may be calculated by the multiplication of the characteristics of the two measurement targets.

The aforementioned third and fourth embodiments show a case, for example, in which two boundary areas 204 and 207 shown in FIG. 5(*b*) and FIG. 6(*b*) are selected as boundary portions. However, a boundary portion other than these boundary portions may also be selected. Particularly, highly advanced recognition is achieved by selecting most relevant two boundary portions. For example, when the boundary portion between a wheel of a bicycle during traveling and the road surface, and the boundary portion between a frame of the bicycle and a driver, are selected, the bicycle driven by a person can be recognized.

In the aforementioned third and fourth embodiments, the boundary portion is detected as the portion in which the shape of the spectral data set greatly varies. However, the present invention is not limited thereto, and the boundary portion may be obtained as the boundary between mutually adjacent different spectrum areas.

Figure 24:
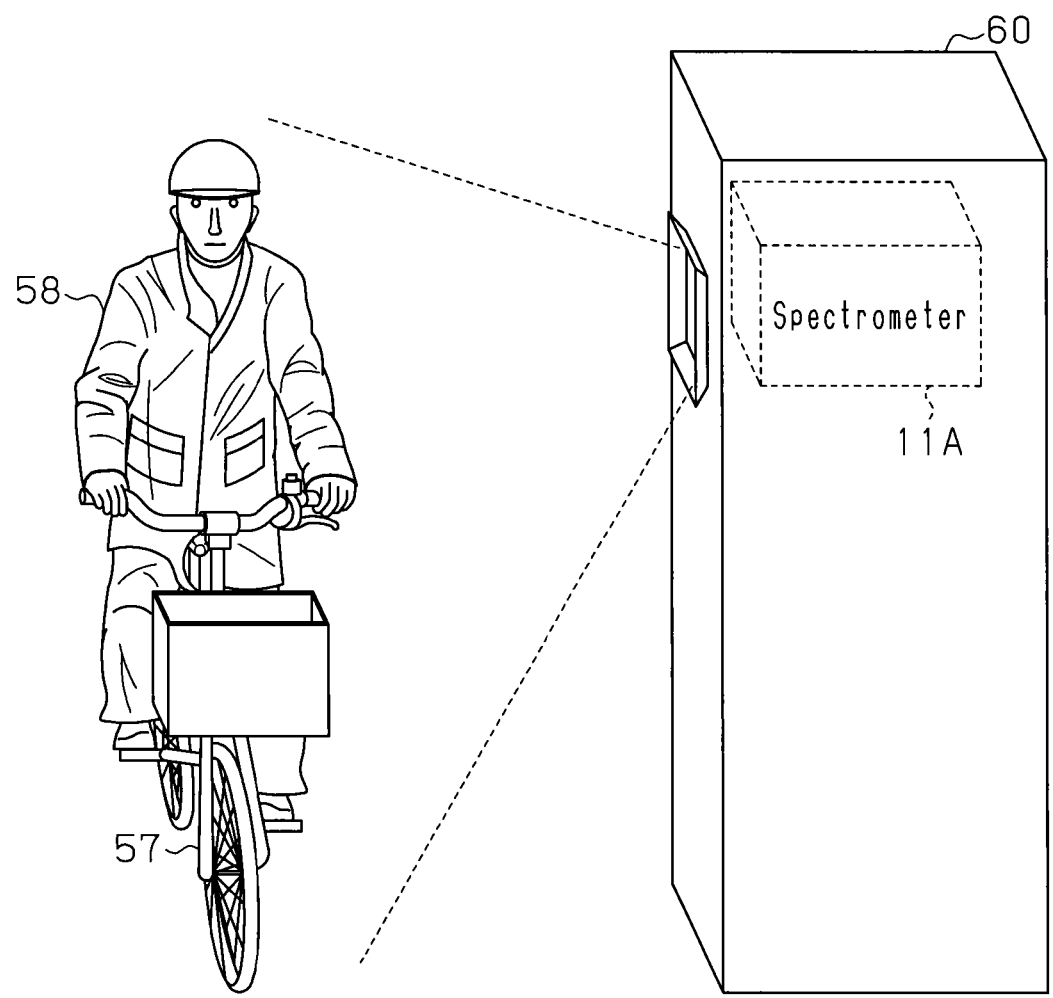
FIG. 24 is a diagram schematically showing an example of an installed object equipped with the spectrometer of the present invention.

Each of the aforementioned embodiments shows a case, for example, in which the spectrometer 11 is mounted on the vehicle 10. However, the present invention is not limited thereto, and the spectrometer may be installed on the ground or buildings in an unmovable form. For example, as shown in FIG. 24, it is also acceptable that a spectrometer 11A is provided in a detector 60, which is installed to detect a road environment, so that the vehicle and the pedestrian, or a bicycle 57 and its rider 58 and the like, may be detected, as the measurement targets that exist in the surrounding environment of the detector 60.

DESCRIPTION OF THE REFERENCE NUMERALS

10: Vehicle
11: Spectrometer
11A: Spectrometer
12: Human-machine interface
13: Vehicle controller
14: Spectral sensor
15: Spectral data processor
16: Arithmetic unit
17: Dictionary data storage section
20: Preprocessing section
21: Normalization processing section
22: Quadratic differential processing section
23: Comparison area selecting section
25: Boundary area selecting section
30: First recognizing section
31: Recognition data generating section
32: Differential data calculating section
33: Matching section
34: Determining section
35: Second recognizing section
36: Third recognizing section
37: Fourth recognizing section
38: Reference area setting section
39: Context calculating section
40: Division processing section
41: Matching section
42: Recognition data generating section
43: Matching section
50: Roadway
51: Sidewalk
52: Tree
53: Automobile
53B: Tire
53C: Bumper
54: Pedestrian
54A: Head portion
54B: Body portion
55: Guardrail 56: Background
57: Bicycle
58: Driver
60: Detector

The invention claimed is:

1. A spectrometer for recognizing a measurement target based on spectral data of observed light detected by a spectral sensor that measures wavelength information and light intensity information, the spectrometer comprising:
   a spectral data processor that
      calculates one correlation spectral data set as one of a ratio of or a difference between two spectral data sets corresponding to two different positions detected by the spectral sensor, and
      simultaneously identifies measurement targets corresponding to the two different positions based on the one correlation spectral data set.

2. The spectrometer according to claim 1, wherein the spectral data processor calculates, as the correlation spectral data set, the ratio or the difference of the spectral data sets corresponding to the two different positions after the spectral data sets undergo at least one of normalization process and quadratic differential process.

3. The spectrometer according to claim 1, wherein
   the spectral data processor performs clustering processing to classify, as spectral data sets in the same spectrum area, spectral data sets in which the difference in light intensities for each wavelength has a predetermined value or less, and
   the spectral data sets corresponding to the two different positions are spectral data sets in two mutually adjacent or two non-adjacent spectrum areas of a plurality of different spectrum areas defined by the clustering processing.

4. The spectrometer according to claim 1, wherein
   the spectral data processor registers beforehand, as data sets for matching, a plurality of data sets each composed of a combination of the spectral data sets of at least two measurement targets corresponding to a correlation spectral data set, and
   based on matching between the correlation spectral data set and the data set for matching, which is registered beforehand, the spectral data processor identifies measurement targets corresponding to the two different positions.

5. The spectrometer according to claim 1, wherein one of the spectral data sets corresponding to the two different positions is a spectral data set of a road surface.

6. The spectrometer according to claim 1, further comprising:
   a context calculator that calculates a context, which is information showing characteristics of a relationship between measurement targets corresponding to the two different positions, wherein
   the context calculator calculates the context based on at least one of a spatial positional relationship and a spatial size relationship of two measurement targets obtained from the spectral data sets corresponding to the two different positions, and
   the correlation spectral data set is a first correlation spectral data set, and the spectral data processor generates a second correlation spectral data set by correlating the first correlation spectral data set to the context, and identifies measurement targets corresponding to the two different positions by using the second correlation spectral data set.

7. The spectrometer according to claim 6, wherein, with one of the spectral data sets corresponding to the two different positions being defined as a reference spectral data set, the spectral data processor calculates, as the second correlation spectral data set, a data set obtained by dividing, by the reference spectral data set, the other one of the spectral data sets, or a data set obtained by subtracting, from the reference spectral data set, the other one of the spectral data sets.

8. The spectrometer according to claim 7, wherein the reference spectral data set is a spectral data set of a road surface.

9. The spectrometer according claim 1, wherein the spectral data sets corresponding to the two different positions are spectral data sets at a boundary portion between at least two different measurement targets.

10. The spectrometer according to claim 9, wherein one of the spectral data sets corresponding to the two different positions is a spectral data set of a road surface.

* * * * *